US011976948B2

(12) United States Patent
Ishikawara et al.

(10) Patent No.: US 11,976,948 B2
(45) Date of Patent: May 7, 2024

(54) ANGLE DETECTION APPARATUS, ANGLE DETECTION SYSTEM, PARK LOCK SYSTEM, PEDAL SYSTEM, AND MAGNETIC FIELD GENERATION MODULE

(71) Applicants: TDK CORPORATION, Tokyo (JP); SAE MAGNETICS (H.K.) LTD., Shatin (HK)

(72) Inventors: Toshio Ishikawara, Tokyo (JP); Takahiro Moriya, Tokyo (JP); Toshihiko Oyama, Tokyo (JP); Seiji Fukuoka, Hong Kong (HK)

(73) Assignees: TDK CORPORATION, Tokyo (JP); SAE MAGNETICS (H.K.) LTD., Hong Kong (CN)

( * ) Notice: Subject to any disclaimer, the term of this patent is extended or adjusted under 35 U.S.C. 154(b) by 0 days.

(21) Appl. No.: 17/222,532

(22) Filed: Apr. 5, 2021

(65) Prior Publication Data

US 2022/0003573 A1 Jan. 6, 2022

(30) Foreign Application Priority Data

Jul. 3, 2020 (JP) .................................. 2020-116002

(51) Int. Cl.
*G01D 5/14* (2006.01)
(52) U.S. Cl.
CPC .................................. *G01D 5/145* (2013.01)
(58) Field of Classification Search
CPC .................................................. G01D 5/145
See application file for complete search history.

(56) References Cited

U.S. PATENT DOCUMENTS

| 6,483,296 | B1* | 11/2002 | Hamaoka | G01D 5/145 |
| | | | | 324/207.2 |
| 6,867,584 | B1 | 3/2005 | Kurita et al. | |
| 10,444,036 | B2 | 10/2019 | Mitsuhashi | |
| 2002/0089324 | A1* | 7/2002 | Miyata | G01D 5/145 |
| | | | | 324/207.2 |
| 2005/0104581 | A1* | 5/2005 | Miyata | G01D 5/145 |
| | | | | 324/207.25 |
| 2016/0169705 | A1* | 6/2016 | Yamashita | B60T 17/22 |
| | | | | 324/207.25 |
| 2020/0168378 | A1* | 5/2020 | Nagatsu | H01F 7/0294 |

FOREIGN PATENT DOCUMENTS

| JP | H05-040808 U | 6/1993 |
| JP | H06-137809 A | 5/1994 |
| JP | H08-105706 A | 4/1996 |

(Continued)

*Primary Examiner* — Stephanie E Bloss
*Assistant Examiner* — Michael A Harrison
(74) *Attorney, Agent, or Firm* — Oliff PLC

(57) ABSTRACT

An angle detection apparatus includes a magnetic sensing element, a magnetic field generator, and a yoke. The magnetic field generator is rotatable around a rotation axis with respect to the magnetic sensing element and generates a magnetic field. The yoke is disposed in a magnetic-field influence region and is rotatable together with the magnetic field generator. The magnetic-field influence region is a region that lies between the magnetic field generator and the magnetic sensing element in a rotation axis direction along the rotation axis, and that is to be influenced by the magnetic field.

18 Claims, 22 Drawing Sheets

(56) References Cited

FOREIGN PATENT DOCUMENTS

| | | |
|---|---|---|
| JP | 2004-361119 A | 12/2004 |
| JP | 2005-140518 A | 6/2005 |
| JP | 2006-208252 A | 8/2006 |
| JP | 2010-133851 A | 6/2010 |
| JP | 2013-027246 A | 2/2013 |
| JP | 2013-160720 A | 8/2013 |
| JP | 2019-191073 A | 10/2019 |
| WO | 2015-050109 A1 | 4/2015 |

* cited by examiner

ANGLE DETECTION APPARATUS, ANGLE DETECTION SYSTEM, PARK LOCK SYSTEM, PEDAL SYSTEM, AND MAGNETIC FIELD GENERATION MODULE

CROSS REFERENCE TO RELATED APPLICATIONS

This application claims the benefit of Japanese Priority Patent Application No. 2020-116002 filed on Jul. 3, 2020, the entire contents of which are incorporated herein by reference.

BACKGROUND

The technology relates to an angle detection apparatus, an angle detection system, a park lock system, a pedal system, and a magnetic field generation module that each include a magnetic sensing element.

An angle detection apparatus suitable for a sensor such as a throttle position sensor has been proposed. The throttle position sensor senses a throttle valve position in an internal combustion engine, for example. Reference is made to, for example, Japanese Unexamined Patent Application Publication No. 2006-208252.

SUMMARY

An angle detection apparatus according to one embodiment of the technology includes a magnetic sensing element, a magnetic field generator, and a yoke. The magnetic field generator is rotatable around a rotation axis with respect to the magnetic sensing element and generates a magnetic field. The yoke is disposed in a magnetic-field influence region and is rotatable together with the magnetic field generator. The magnetic-field influence region is a region that lies between the magnetic field generator and the magnetic sensing element in a rotation axis direction along the rotation axis, and that is to be influenced by the magnetic field.

An angle detection system according to one embodiment of the technology includes: the angle detection apparatus according to one embodiment of the technology; and a support supporting the magnetic field generator. The support includes an attachment hole. The yoke is provided on the magnetic field generator or on the support.

A park lock system according to one embodiment of the technology includes the angle detection system according to one embodiment of the technology.

A pedal system according to one embodiment of the technology includes the angle detection system according to one embodiment of the technology.

A magnetic field generation module according to one embodiment of the technology includes a magnetic field generator and a yoke. The magnetic field generator is rotatable around a rotation axis. The yoke is disposed in a region different from a region where the magnetic field generator is disposed in a rotation axis direction along the rotation axis, and is rotatable together with the magnetic field generator.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
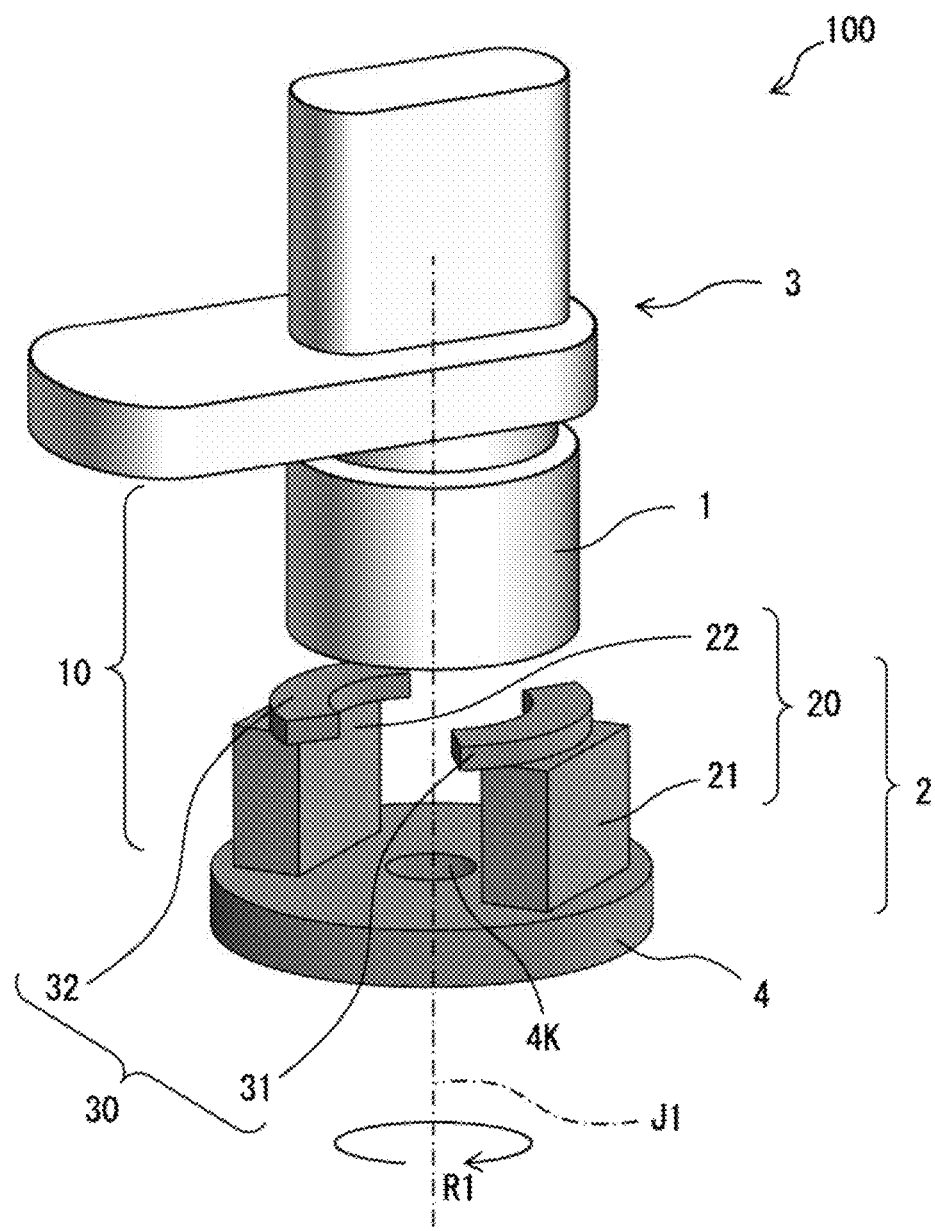
FIG. 1 is a schematic perspective diagram illustrating an overall configuration example of an angle detection system according to one example embodiment of the technology.

It is demanded that an angle detection apparatus suitable for a sensor such a throttle position sensor be improved in accuracy of angle detection.

It is desirable to provide an angle detection apparatus, an angle detection system, a park lock system, a pedal system, and a magnetic field generation module that achieve high accuracy of angle detection.

In the following, some example embodiments and modification examples of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions. Note that the description is given in the following order.

1. Example Embodiment
2. Experiment Examples
3. Modification Examples
4. Application Examples
5. Other Modification Examples

1. EXAMPLE EMBODIMENT

[Configuration of Angle Detection System 100]

First, a configuration of an angle detection system 100 according to an example embodiment of the technology will be described with reference to FIGS. 1 to 3.

FIG. 1 is a perspective diagram illustrating an overall configuration example of the angle detection system 100.

Figure 2:
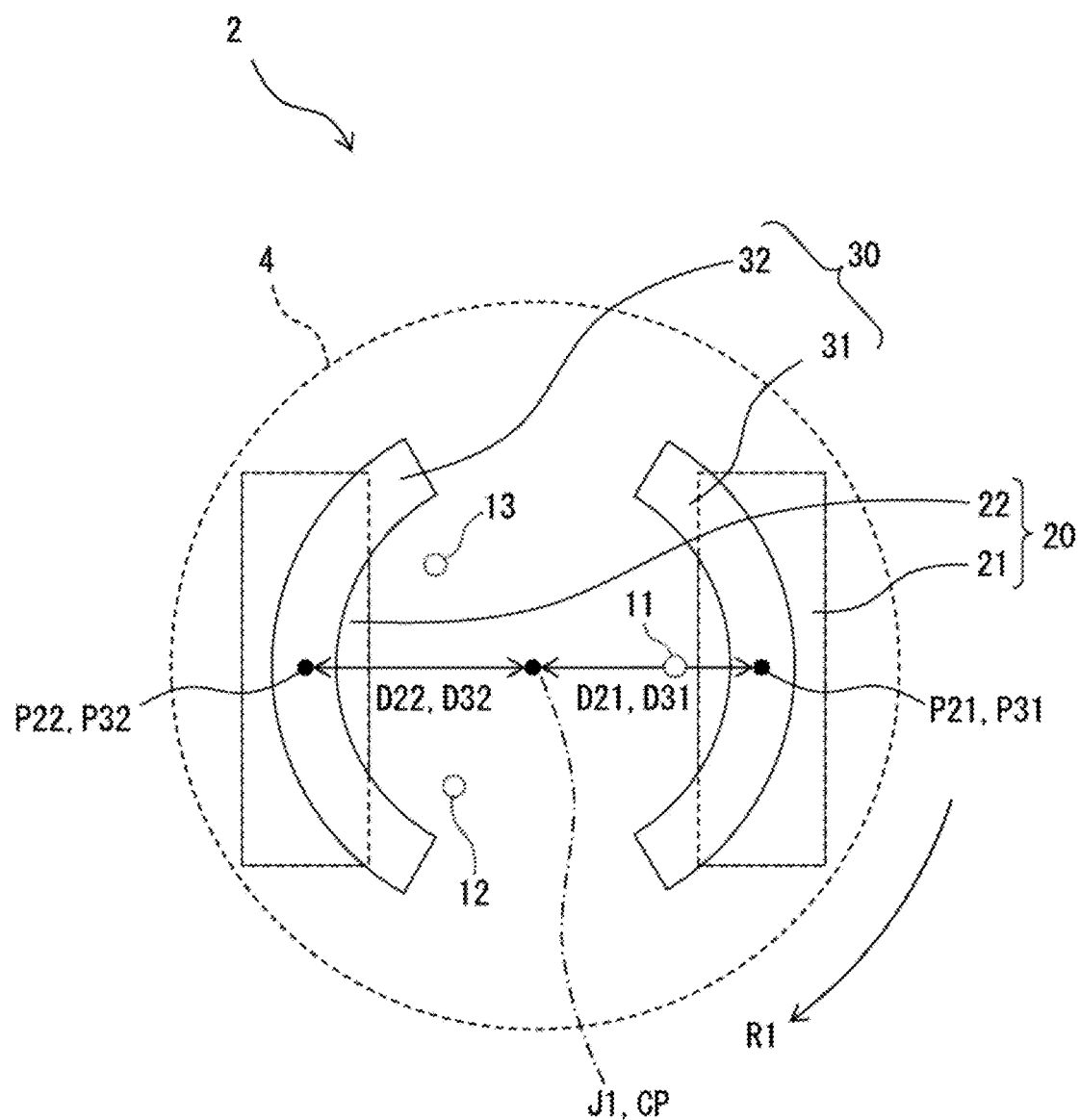
FIG. 2 is a schematic plan view of a magnetic field generation module of an angle detection apparatus illustrated in FIG. 1.
Figure 3:
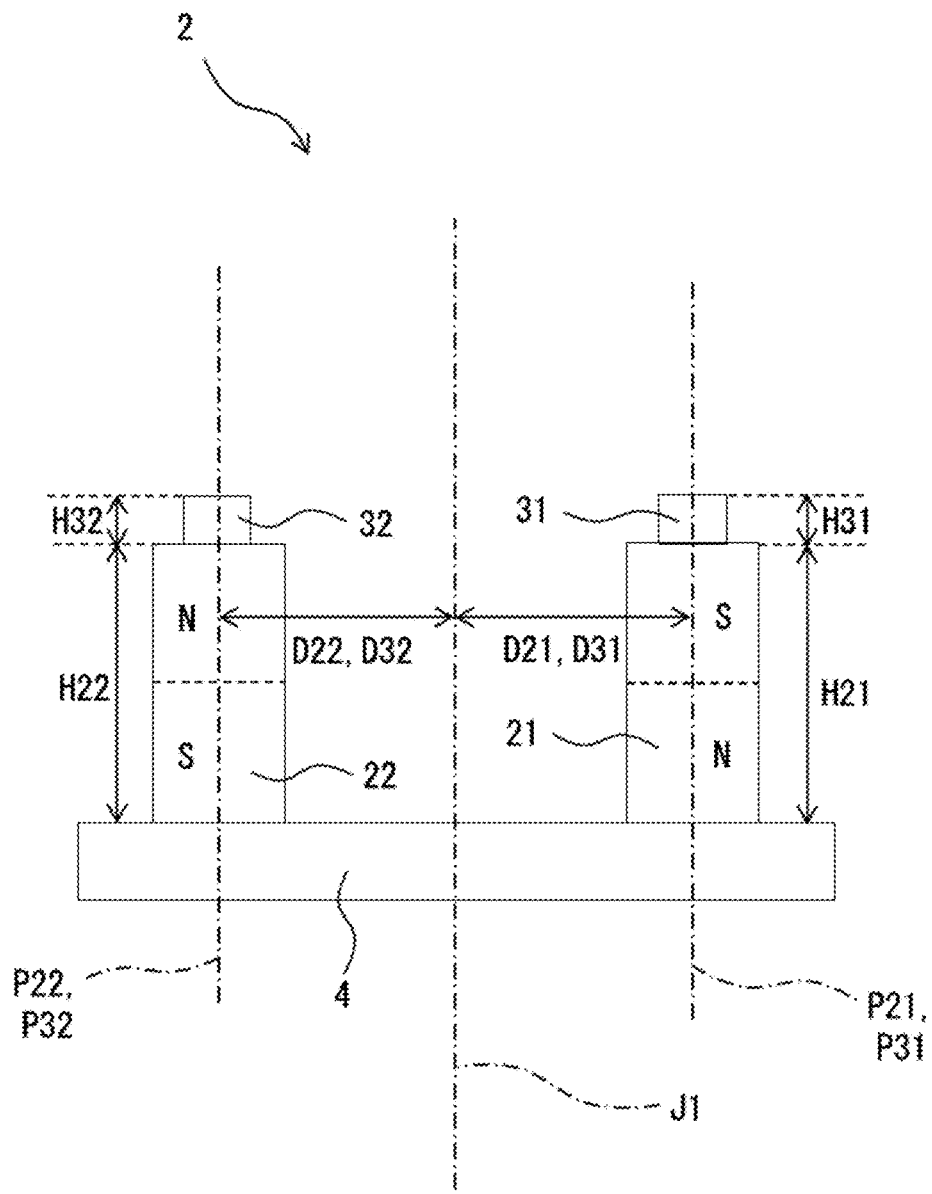
FIG. 3 is a front view of the magnetic field generation module of the angle detection apparatus illustrated in FIG. 1.

FIG. 2 is a schematic planar diagram for describing a mutual positional relationship between components of a magnetic field generation module 2 (described later) in the angle detection system 100 in a plane orthogonal to a rotation axis J1 (described later). It is to be noted that, as used herein, the term "orthogonal" encompasses not only being completely orthogonal, i.e., intersecting at 90°, but also being substantially orthogonal, i.e., intersecting at 90°±about 5°, for example. The schematic planar diagram in FIG. 1 may therefore represent a plane at an angle slightly different from 90° with respect to the rotation axis J1. FIG. 2 illustrates the magnetic field generation module 2 as viewed from a sensor unit 1 (described later). Note that in FIG. 2, respective outlines of magnetic sensing elements 11 to 13 (described later) included in the sensor unit 1 and a support 4 (described later) supporting the magnetic field generation module 2 are indicated in dashed lines. FIG. 3 illustrates the magnetic field generation module 2 as viewed from the front, that is, as viewed in a direction orthogonal to the rotation axis J1. The support 4 is also illustrated in FIG. 3. The angle detection system 100 may be a system detecting, for example, a rotation angle of a rotary member that rotates, and may be applicable, for example, as a throttle position sensor configured to sense a throttle valve position in an internal combustion engine to be installed in a vehicle such as an automobile.

As illustrated in FIG. 1, the angle detection system 100 may include, for example, an angle detection apparatus 10, a support 3, and the support 4. The angle detection apparatus 10 may include, for example, the sensor unit 1 and the magnetic field generation module 2. The sensor unit 1 may be supported by the support 3, for example. The magnetic field generation module 2 may be supported by the support 4, for example. The magnetic field generation module 2 may include, for example, a magnetic field generation unit 20 and a yoke unit 30. The magnetic field generation unit 20 may include a magnetic field generator that generates a magnetic field to be detected that is to be detected at the sensor unit 1, and may be rotatable, for example, in a rotation direction R1 around the rotation axis J1 with respect to the sensor unit 1. Hereinafter, the "magnetic field to be detected" will be referred to as a "detection-target magnetic field". The sensor unit 1 may include a plurality of magnetic sensing elements that senses, for example, an intensity and/or direction of the detection-target magnetic field to be generated by the magnetic field generator. The yoke unit 30 is disposed in a magnetic-field influence region and is rotatable together with the magnetic field generation unit 20. The magnetic-field influence region is a region that lies between the magnetic field generation unit 20 and the sensor unit 1 in a rotation axis direction, and that is to be influenced by the detection-target magnetic field.

[Sensor Unit 1]

As illustrated in FIG. 2, the sensor unit 1 may include the three magnetic sensing elements 11 to 13 as the plurality of magnetic sensing elements, for example. The magnetic sensing elements 11 to 13 may be provided around the rotation axis J1 at mutually different positions in a plane orthogonal to the rotation axis direction. In some embodiments, a center position CP located at equal distances from the magnetic sensing elements 11 to 13 may coincide with the position of the rotation axis J1, for example. In other words, the magnetic sensing elements 11 to 13 may be at equal distances from the rotation axis J1. The magnetic sensing elements 11 to 13 may be elements configured to sense the intensity and/or direction of a magnetic field, such as Hall elements. In a case where the magnetic sensing elements 11 to 13 are Hall elements, for example, the magnetic sensing elements 11 to 13 are each able to sense a magnetic field intensity along the rotation axis J1. On the basis of the magnetic field intensity in the rotation axis direction sensed at each of the magnetic sensing elements 11 to 13, angle information is obtained by calculation in accordance with the following equation (1).

$$\phi = \mathrm{atan}\left(\frac{\sqrt{3} \times V1}{V3 - V2}\right) \quad (1)$$

In equation (1), $\phi$ represents the rotation angle of the magnetic field generation module 2, and V1 to V3 represent output voltages corresponding to magnetic field intensities along the rotation axis J1 sensed at the magnetic sensing elements 11 to 13, respectively. Note that an example of a contactless angle detection apparatus using Hall elements is disclosed in U.S. Pat. No. 9,933,279, for example.

[Magnetic Field Generation Unit 20]

The magnetic field generation unit 20 may include a magnet 21 and a magnet 22, for example, each serving as the magnetic field generator. The magnets 21 and 22 may each have a shape having basically planes only, such as a substantially cube shape or a substantially cuboid shape. The magnets 21 and 22 may be spaced apart from each other around the rotation axis J1. For example, a distance between the magnet 21 and the rotation axis J1 and a distance between the magnet 22 and the rotation axis J1 may be equal. Here, the distance between magnet 21 and the rotation axis J1 and the distance between the magnet 22 and the rotation axis J1 respectively refer to, for example, as illustrated in FIG. 2, a distance D21 between a geometric center position P21 of the magnet 21 and the rotation axis J1 and a distance D22 between a geometric center position P22 of the magnet 22 and the rotation axis J1 in a plane orthogonal to the rotation axis J1. The magnets 21 and 22 may be substantially identical in material, shape, and size. The magnets 21 and 22 may be provided at rotationally symmetrical positions with respect to the rotation axis J1 so to be opposed to each other with the rotation axis J1 interposed therebetween, for example. As illustrated in FIG. 3, the magnets 21 and 22 may both be magnetized in the rotation axis direction. Examples of the material of each of the magnets 21 and 22 may include a neodymium-based magnet material such as NdFeB and a rare-earth magnet material such as SmCo.

[Yoke Unit 30]

The yoke unit 30 may include a yoke 31 and a yoke 32 spaced apart from each other around the rotation axis J1, for example. In a cross section orthogonal to the rotation axis J1, for example, the yokes 31 and 32 may each be curved in an arc shape along the direction of rotation around the rotation axis J1, i.e., the rotation direction R1. As viewed from the rotation axis J1, the arc-shaped yokes 31 and 32 may each have a central angle in a range from 106° to 110° both inclusive, for example. In a more specific but non-limiting example, the central angle may be in a range from 107° to 109° both inclusive. The central angle of each of the arc-shaped yokes 31 and 32 may be set in accordance with a rotation angle range, however. The yokes 31 and 32 may be provided at rotationally symmetrical positions with respect to the rotation axis J1 so to be opposed to each other with the rotation axis J1 therebetween, for example. The yokes 31 and 32 may be positioned to overlap the magnets 21 and 22, respectively, in the rotation axis direction. As illustrated in FIG. 3, the yokes 31 and 32 may be in contact with the magnets 21 and 22, respectively. Further, for example, a distance between the yoke 31 and the rotation axis J1 and a distance between the yoke 32 and the rotation axis J1 may be equal. Here, the distance between yoke 31 and the rotation axis J1 and the distance between the yoke 32 and the rotation axis J1 respectively refer to, for example, as illustrated in FIG. 2, a distance D31 between a geometric center position P31 of the yoke 31 and the rotation axis J1 and a distance D32 between a geometric center position P32 of the yoke 32 and the rotation axis J1 in a plane orthogonal to the rotation axis J1. In the magnetic field generation module 2 of the present example embodiment, the center position P31 of the yoke 31 may coincide with the center position P21 of the magnet 21, and the center position P32 of the yoke 32 may coincide with the center position P22 of the magnet 22, for example. That is, all the distances D21, D22, D31, and D32 may be equal. Further, the yokes 31 and 32 may be substantially identical in material, shape, and size. A height dimension H21 of the magnet 21 in the rotation axis direction may be greater than a height dimension H31 of the yoke 31 in the rotation axis direction. Likewise, a height dimension H22 of the magnet 22 in the rotation axis direction may be greater than a height dimension H32 of the yoke 32 in the rotation axis direction. Examples of the material of each of the yokes 31 and 32 may include a soft magnetic material such as NiFe.

[Support 4]

The support 4 may support the magnets 21 and 22 and have a circular plate shape, for example. The support 4 may have an attachment hole 4K in the middle thereof, for example, and may be attachable to a rotating body via a screw or the like. In a case where the angle detection system 100 is applied as the throttle position sensor described above, the support 4 may be coupled to a rotary shaft of the throttle valve, which is a rotating body, and the support 3 may be fixed to, for example, a frame of the internal combustion engine. The yokes 31 and 32 may be fixed to the magnets 21 and 22, respectively. Optionally, the yokes 31 and 32 may be directly fixed to the support 4. In either case, the magnetic field generation unit 20 and the yoke unit 30 are rotatable together with the support 4 in the rotation direction R1.

[Operation of Angle Detection System 100]

In the angle detection system 100, upon rotation of the rotating body (e.g., the rotary shaft of the throttle valve) to which the support 4 is attached, the support 4, the magnetic field generation unit 20, and the yoke unit 30 may rotate together in the rotation direction R1. This causes the detection-target magnetic field (magnetic flux) passing through the sensor unit 1 to change direction periodically. As a result, the magnetic sensing elements 11 to 13 in the sensor unit 1 each sense the magnetic field (magnetic flux) of an intensity that changes in a sinusoidal manner in accordance with the rotation angle of the magnetic field generation module 2. The rotation angle of the rotating body to which the magnetic field generation module 2 is fixed is therefore determinable from the values of the magnetic field (magnetic flux) sensed at the magnetic sensing elements 11 to 13. It is to be noted that the sinusoidal curves respectively defined by the magnetic field intensities sensed at the magnetic sensing elements 11 to 13 may be out of phase with each other because the magnetic sensing elements 11 to 13 may be disposed at relatively different positions along the rotation direction R1 with respect to the rotation axis J1 as the center of rotation of the magnetic field generation module 2.

[Workings and Effects of Angle Detection System 100]

As described above, the angle detection system 100 of the example embodiment includes: the sensor unit 1 including the magnetic sensing elements 11 to 13; the magnets 21 and 22 that are rotatable around the rotation axis J1 with respect to the sensor unit 1 and generate the detection-target magnetic field; and the yokes 31 and 32 that are disposed in the magnetic-field influence region and are rotatable together with the magnets 21 and 22. The magnetic-field influence region is a region that lies between the magnets 21 and 22 and the magnetic sensing elements 11 to 13 in the rotation axis direction, and that is to be influenced by the detection-target magnetic field. This configuration improves the accuracy of angle detection as compared with a case where no yokes are provided, like an angle detection system 101 according to a first reference example illustrated in FIG. 24, for example. The angle detection system 101 according to the first reference example in FIG. 24 has the same configuration as that of the angle detection system 100 of the present example embodiment except that the yokes 31 and 32 are omitted.

Figure 25:
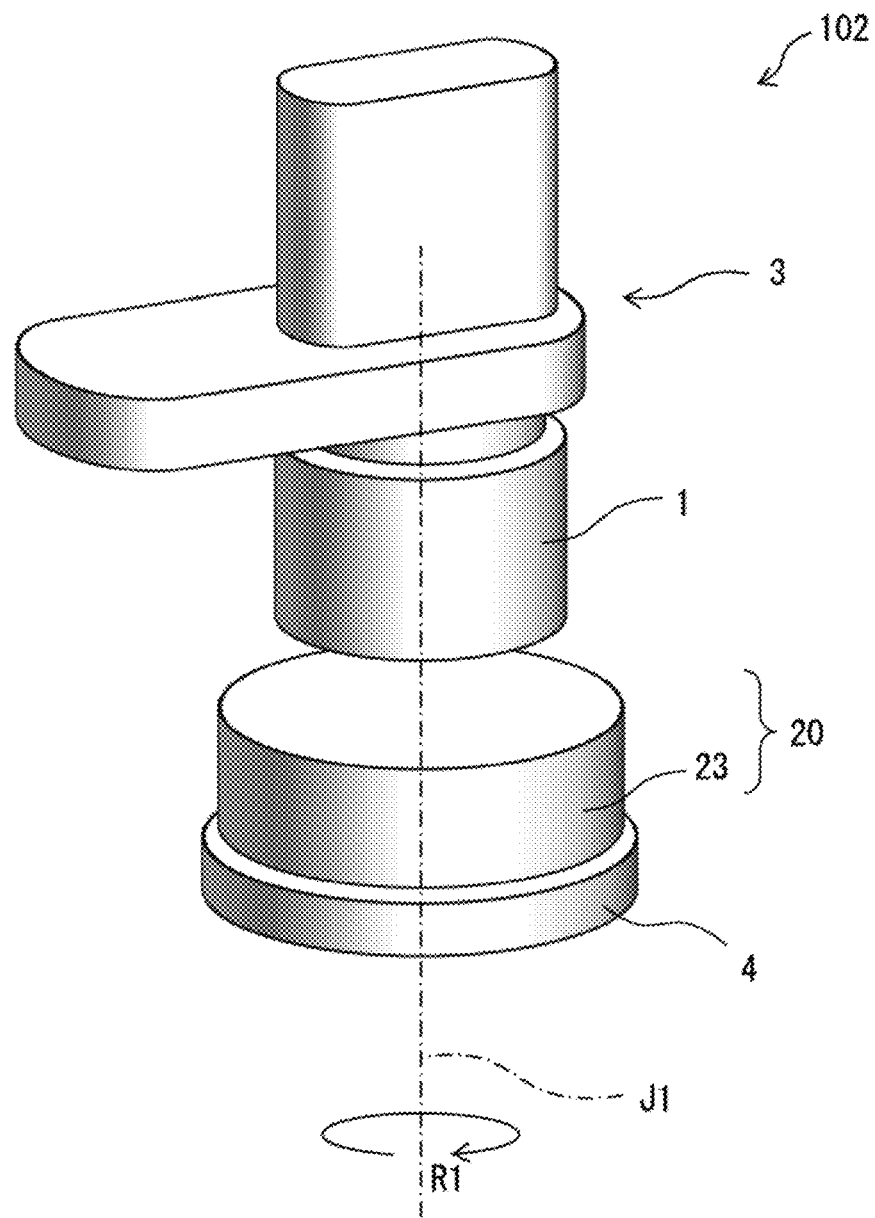
FIG. 25 is a perspective view of an appearance of an angle detection system according to a second reference example.

FIG. 25 illustrates an angle detection system 102 according to a second reference example in which the magnetic field generation unit 20 includes a magnet 23 of a substantially cylindrical shape, in place of the magnets 21 and 22. In this case, the cylindrical-shaped magnet 23 of the angle detection system 102 tends to have a higher volume than a total volume of the magnets 21 and 22 disposed separately from each other. In contrast, in the angle detection system 100 of the present example embodiment, the yoke unit 30 is provided between the magnetic field generation unit 20 (the magnets 21 and 22) and the sensor unit 1. Accordingly, it is possible to make the total volume of the magnets 21 and 22 smaller than the volume of the magnet 23 while maintaining the accuracy of angle detection at the sensor unit 1 equivalent to that of the angle detection system 102. This helps to achieve reductions in size and weight.

Further, in the angle detection system 102 according to the second reference example, in order for the sensor unit 1 to detect a rotation angle of the magnetic field generation module 2, it is necessary that the cylindrical-shaped magnet 23 be magnetized in a direction along the plane orthogonal to the rotation axis direction. However, it is difficult to identify the magnetizing direction of the cylindrical-shaped magnet 23 from its outer appearance. This can become a hindrance to, for example, accurately aligning initial relative positions of the magnet 23 and the sensor unit 1 with each other. In contrast, in the angle detection system 100 of the present example embodiment, it is easy to identify the magnetizing directions of the magnets 21 and 22 from their arrangement positions and shape. This provides superior handleability in assembling, for example.

In the angle detection system 100 of the above-described example embodiment, the yokes 31 and 32 may be positioned to overlap the magnets 21 and 22, respectively, in the rotation axis direction. This allows the yokes 31 and 32 to have a higher effect of concentrating magnetic flux, thereby reducing unevenness in intensity distribution of the detection-target magnetic field, i.e., unevenness in distribution of magnetic flux densities, in a region near the sensor unit 1, as compared with a case where the yokes 31 and 32 are positioned not to overlap the magnets 21 and 22, respectively, in the rotation axis direction. As a result, the accuracy of angle detection is further improved.

In the angle detection system 100 of the above-described example embodiment, the yokes 31 and 32 may be disposed in contact with the magnets 21 and 22, respectively, in the rotation axis direction. This allows the yokes 31 and 32 to have a higher effect of concentrating magnetic flux, thereby reducing unevenness in intensity distribution of the detection-target magnetic field, i.e., unevenness in distribution of magnetic flux densities, in a region near the sensor unit 1, as compared with a case where the yokes 31 and 32 are spaced apart from the magnets 21 and 22, respectively. As a result, the accuracy of angle detection is further improved.

In the angle detection system 100 of the above-described example embodiment, the height dimensions H21 and H22 of the magnets 21 and 22 in the rotation axis direction may be greater than the height dimensions H31 and H32 of the yokes 31 and 32 in the rotation axis direction, respectively. This makes it possible keep good balance between the volume of the magnets 21 and 22 and the volume of the yokes 31 and 32. This helps to reduce a dimension, such as a dimension in the rotation axis direction, of the entire system while effectively supplying the sensor unit 1 with the detection-target magnetic field having a higher intensity.

In the angle detection system 100 of the above-described example embodiment, the magnets 21 and 22 may be magnetized in the rotation axis direction. This makes it possible to apply the detection-target magnetic field along the rotation axis direction effectively to the magnetic sensing elements 11 to 13 each having a sensitive axis along the rotation axis direction.

In the angle detection system 100 of the above-described example embodiment, the magnets 21 and 22 may both have a substantially cube shape or a substantially cuboid shape. This allows the magnets 21 and 22 to be superior in processability at the time of their fabrication, and consequently suitable for, for example, mass production as compared with an arc-shaped magnet, for example.

In the angle detection system 100 of the above-described example embodiment, the magnetic field generation unit 20 may include the two magnets 21 and 22 that are spaced apart from each other around the rotation axis J1. This allows the magnets 21 and 22 to be smaller in total volume without reduction in accuracy of angle detection as compared with a case where the magnetic field generation unit 20 includes only a single magnet. It is thus possible to achieve a lighter weight.

In the angle detection system 100 of the above-described example embodiment, the magnets 21 and 22 may be substantially identical in material, shape, and size. This makes it possible to further improve the accuracy of angle detection as compared with a case where the magnets 21 and 22 are different from each other in material, shape, and size. Further, the distance D21 and the distance D22 may be equal. This makes it possible to further improve the accuracy of angle detection as compared with a case where the distances D21 and D22 are different. One reason for this is that making the distances D21 and D22 equal reduces unevenness of the detection-target magnetic field to be applied to the sensor unit 1 associated with the rotation angle of the magnetic field generation module 2.

In the angle detection system 100 of the above-described example embodiment, the yokes 31 and 32 may each be curved in an arc shape along the rotation direction R1 as viewed in a plane orthogonal to the rotation axis J1. This makes it possible to further improve the accuracy of angle detection as compared with a case where the yokes 31 and 32 each have a linearly extending shape in a plan view, for example. One reason for this is that making the yokes 31 and 32 curved in an arc shape reduces unevenness of the detection-target magnetic field to be applied to the sensor unit 1 associated with the rotation angle of the magnetic field generation module 2.

Further, the yoke unit 30 may include the two yokes 31 and 32 that are spaced apart from each other around the rotation axis J1. This makes it possible to achieve a lighter weight as compared with a case where the yokes 31 and 32 are joined to each other into a single annular shape.

Further, the yokes 31 and 32 may be provided at rotationally symmetrical positions with respect to the rotation axis J1. This makes it possible to further improve the accuracy of angle detection as compared with a case where the yokes 31 and 32 are not positioned to be rotationally symmetrical. Further, the distance D31 and the distance D32 may be equal. This makes it possible to further improve the accuracy of angle detection as compared with a case where the distances D31 and D32 are different. One reason for the above is that providing the yokes 31 and 32 at rotationally symmetrical positions and making the distances D31 and D32 equal each reduce unevenness of the detection-target magnetic field to be applied to the sensor unit 1 associated with the rotation angle of the magnetic field generation module 2.

2. EXPERIMENT EXAMPLES

Figure 24:
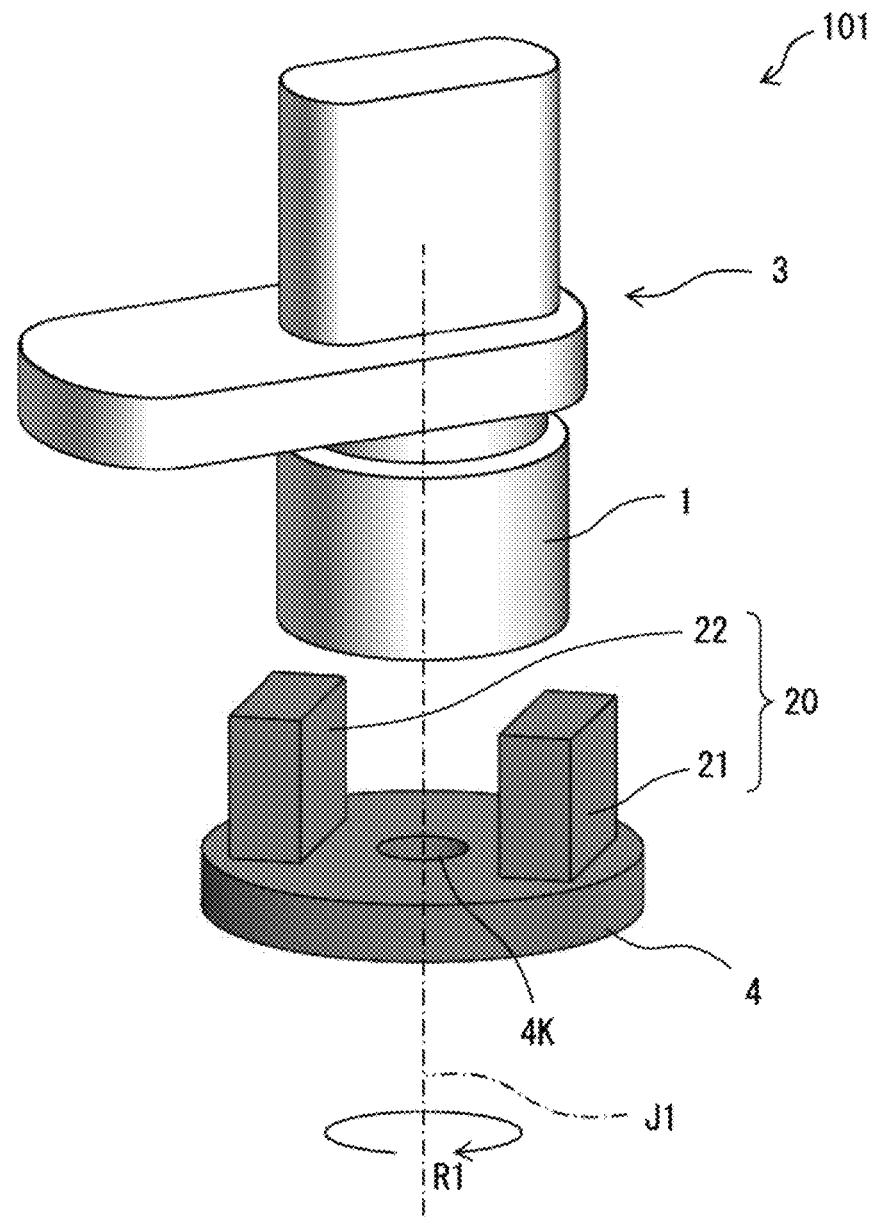
FIG. 24 is a perspective view of an appearance of an angle detection system according to a first reference example.

Performance comparisons were performed between the angle detection system 100 of the above-described example embodiment illustrated in FIG. 1 and the angle detection systems 101 and 102 of the reference examples illustrated in FIGS. 24 and 25, respectively.

Experiment Example 1-1

A simulation was performed on the angle detection system 100 of the above-described example embodiment, as Experiment Example 1-1, to determine changes in magnetic flux density to be detected at the sensor unit 1 upon rotation of the magnetic field generation module 2 with a noise magnetic field of an intensity of 5 mT being applied in the rotation axis direction. Here, the simulation examined a characteristic of the sensor unit 1 in a case where, in a plane orthogonal to the rotation axis J1, the magnetic sensing elements 11 to 13 were shifted by 1 mm rightward in the plane of the paper from their respective original positions 11A to 13A, that is, in a case where the center position CP located at equal distances from the magnetic sensing elements 11 to 13 was shifted by 1 mm toward the magnetic sensing element 11 from its original position coinciding with the rotation axis J1. The magnets 21 and 22 were neodymium magnets, i.e., rare-earth magnets including neodymium, iron, and boron as constituent elements. The magnets 21 and 22 each had dimensions of 6.0 mm×2.5 mm×5.0 mm. The distances D21 and D22 were each 4.75 mm. A material for the arc-shaped yokes 31 and 32 was SPCC (common steel). The yokes 31 and 32 each had a central angle of 108°. The height dimensions H31 and H32 of the yokes 31 and 32 were each 0.85 mm. The yokes 31 and 32 were 1 mm apart from the magnetic sensing elements 11 to 13 in the rotation axis direction.

Figure 4:
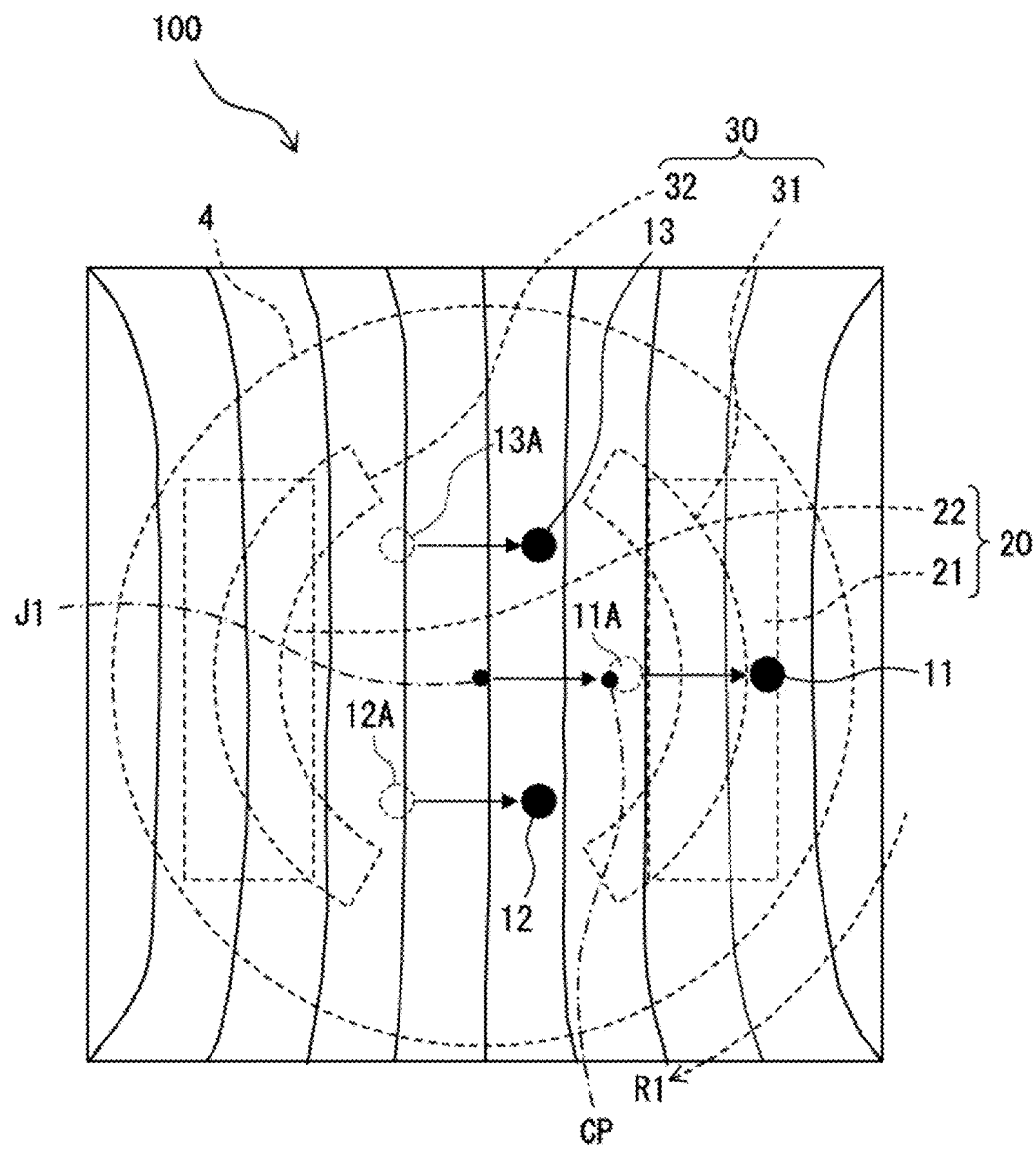
FIG. 4 is a contour diagram schematically illustrating a magnetic flux density distribution in a rotation axis direction in an angle detection apparatus of Experiment Example 1-1.

FIG. 4 is a contour diagram schematically illustrating a magnetic flux density distribution in the rotation axis direction in a sensing plane of the angle detection system 100 of Experiment Example 1-1. The sensing plane is a plane orthogonal to the rotation axis J1 and including the magnetic sensing elements 11 to 13. Note that FIG. 4 illustrates a state at a rotation angle of 0°. In Experiment Example 1-1, as illustrated in FIG. 4, contour lines representing the magnetic flux densities extended vertically along opposing surfaces of the two magnets 21 and 22 in the plane of the paper in at least a region corresponding to the magnetic sensing elements 11 to 13. This indicates that it is possible to apply a magnetic field having a relatively uniform intensity (magnetic flux density) to the magnetic sensing elements 11 to 13. It is thus seen that this configuration helps to improve the accuracy of angle detection by the magnetic sensing elements 11 to 13.

Figure 5A:
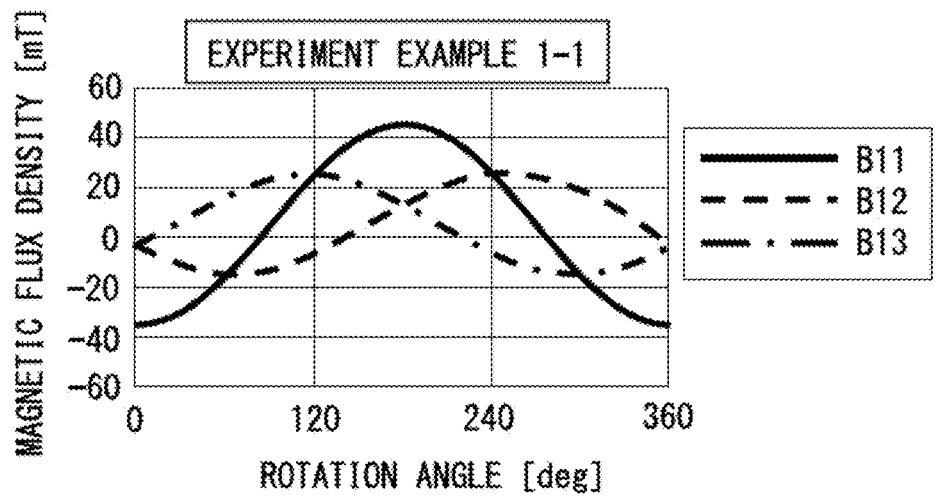
FIG. 5A is a characteristic diagram illustrating a rotation angle dependence of a magnetic flux density of a detection-target magnetic field (i.e., a magnetic field to be detected) to be applied to each of magnetic sensing elements in an angle detection system of Experiment Example 1-1.

FIG. 5A is a characteristic diagram illustrating a relationship between the magnetic flux density [mT] of the detection-target magnetic field to be applied to each of the magnetic sensing elements 11 to 13 and the rotation angle [deg] of the magnetic field generation module 2 in the angle detection system 100 of Experiment Example 1-1. In FIG. 5A, a curve B11 represents a rotation angle dependence of the magnetic flux density of the detection-target magnetic field to be sensed by the magnetic sensing element 11; a curve B12 represents a rotation angle dependence of the magnetic flux density of the detection-target magnetic field to be sensed by the magnetic sensing element 12; and a curve 13 represents a rotation angle dependence of the magnetic flux density of the detection-target magnetic field to be sensed by the magnetic sensing element 13.

Figure 5B:
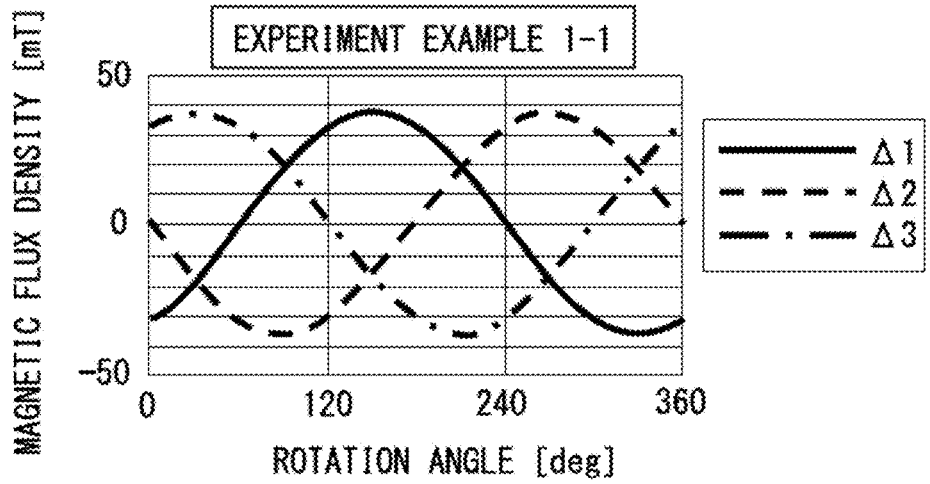
FIG. 5B is a characteristic diagram illustrating differences between the magnetic flux densities of the detection-target magnetic field to be applied to the magnetic sensing elements in the angle detection system of Experiment Example 1-1.

FIG. 5B is a characteristic diagram illustrating how differences between the curves B11, B12, and B13 illustrated in FIG. 5A changed with the rotation angle [deg] of the magnetic field generation module 2. In FIG. 5B, a curve Δ1 represents a difference between the curve B11 and the curve B12 in FIG. 5A; a curve Δ1 represents a difference between the curve B12 and the curve B13 in FIG. 5A; and a curve 43 represents a difference between the curve B13 and the curve B11 in FIG. 5A.

Figure 5C:
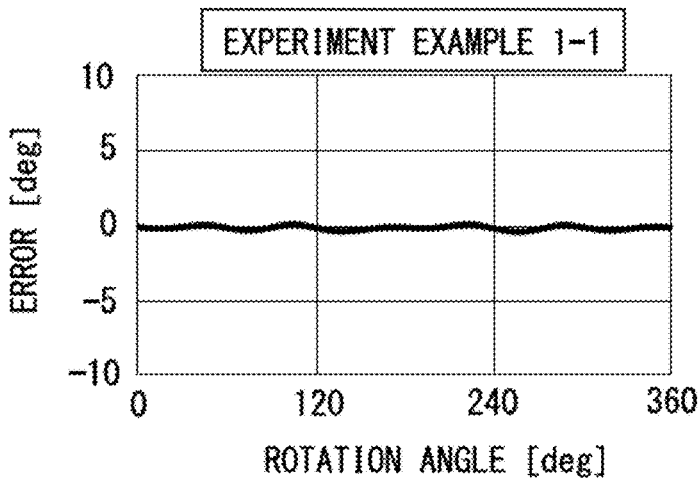
FIG. 5C is a characteristic diagram illustrating an error of a rotation angle to be sensed by each of the magnetic sensing elements in the angle detection system of Experiment Example 1-1.

FIG. 5C illustrates an error of the rotation angle of the magnetic field generation module 2 determined from the curves Δ1 to Δ3 illustrated in FIG. 5B. In this experiment example, a largest value (absolute value) of the error did not exceed 0.2°.

Experiment Example 1-2

Figure 6:
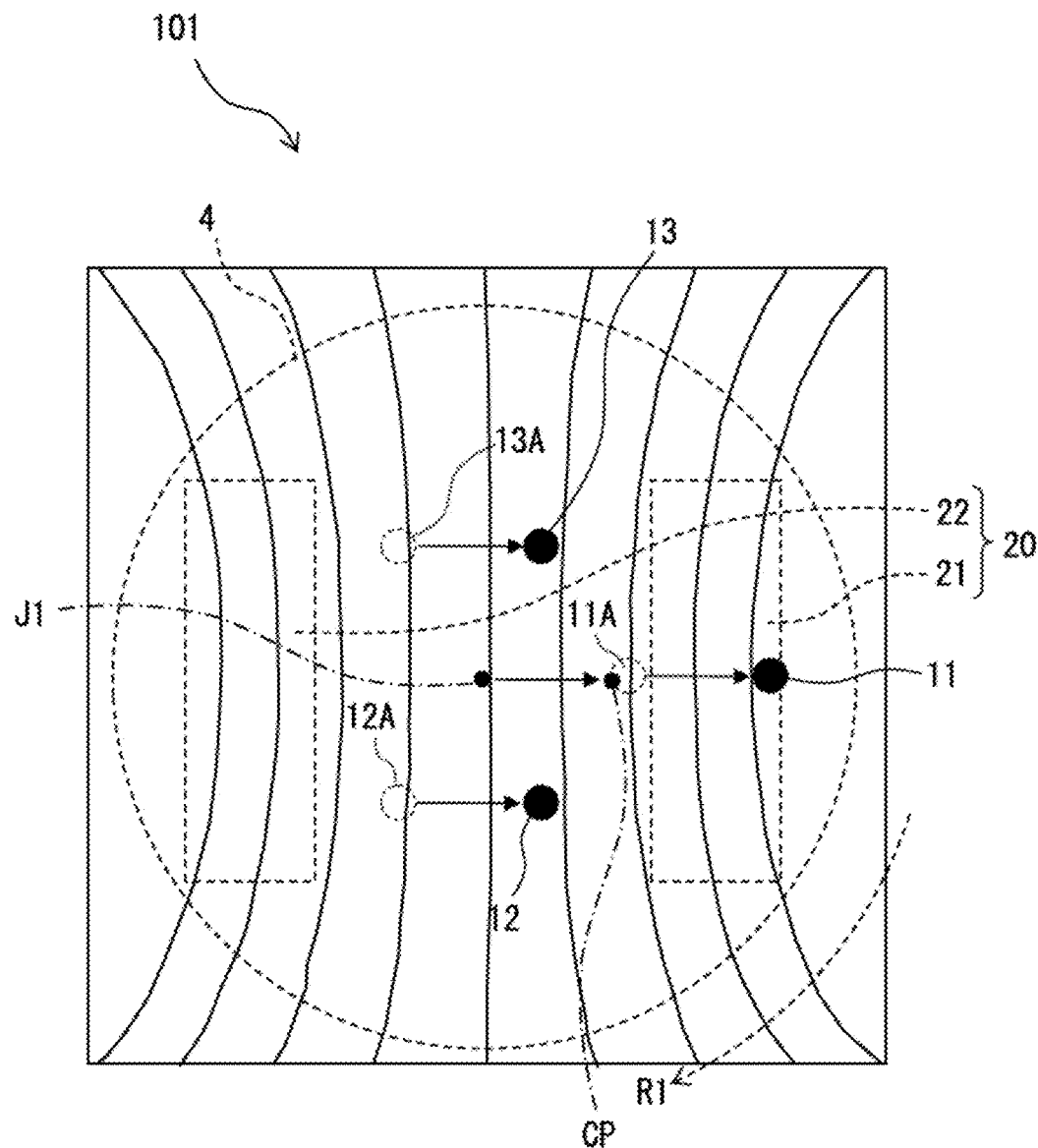
FIG. 6 is a contour diagram schematically illustrating a magnetic flux density distribution in the rotation axis direction in an angle detection system of Experiment Example 1-2.

Next, as Experiment Example 1-2, the angle detection system 101 of the first reference example illustrated in FIG. 24 was subjected to a similar evaluation under similar conditions to those on Experiment Example 1-1 above. FIG. 6 is a contour diagram schematically illustrating a magnetic flux density distribution in the rotation axis direction in the sensing plane of the angle detection system 101 of Experiment Example 1-2. Note that FIG. 6 illustrates a state at a rotation angle of 0°. In Experiment Example 1-2, as illustrated in FIG. 6, the contour lines representing the magnetic flux densities became curved greatly with increasing distance from the rotation axis J1 with respect to the vertical direction along the opposing surfaces of the two magnets 21 and 22 in the plane of the paper, as compared with Experiment Example 1-1 illustrated in FIG. 4. This indicates that the magnetic sensing elements 11 to 13 are to be subjected to a magnetic field that exhibits relatively great unevenness in intensity (magnetic flux density). It is thus seen that this configuration reduces the accuracy of angle detection by the magnetic sensing elements 11 to 13.

Figure 7A:
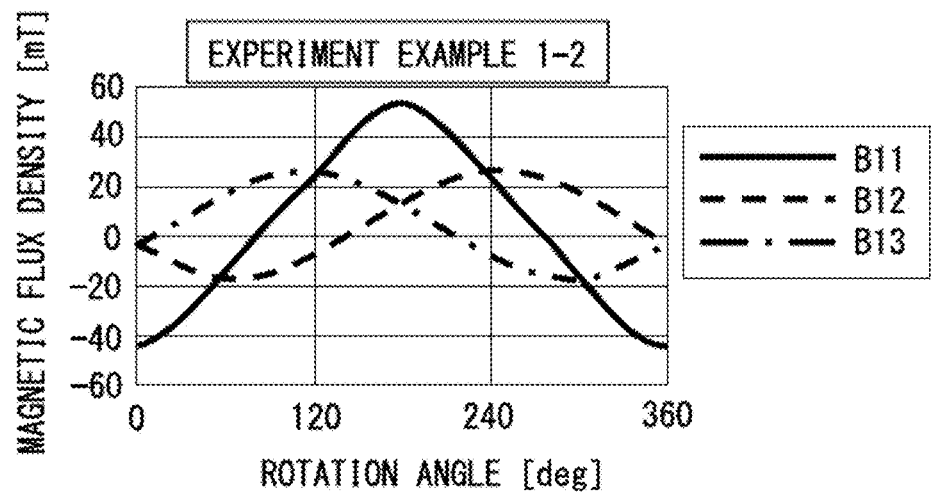
FIG. 7A is a characteristic diagram illustrating a rotation angle dependence of the magnetic flux density of the detection-target magnetic field to be applied to each of the magnetic sensing elements in the angle detection system of Experiment Example 1-2.

FIG. 7A is a characteristic diagram illustrating a relationship between the magnetic flux density [mT] of the detection-target magnetic field to be applied to each of the magnetic sensing elements 11 to 13 and the rotation angle [deg] of the magnetic field generation module 2 in the angle detection system 101 of Experiment Example 1-2.

Figure 7B:
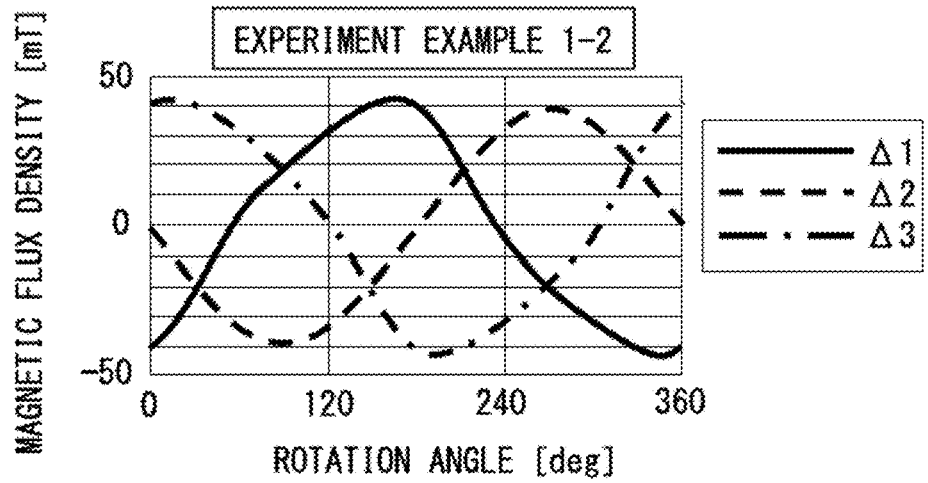
FIG. 7B is a characteristic diagram illustrating differences between the magnetic flux densities of the detection-target magnetic field to be applied to the magnetic sensing elements in the angle detection system of Experiment Example 1-2.

FIG. 7B is a characteristic diagram illustrating how the differences between the curves B11, B12, and B13 illustrated in FIG. 7A changed with the rotation angle [deg] of the magnetic field generation module 2.

Figure 7C:
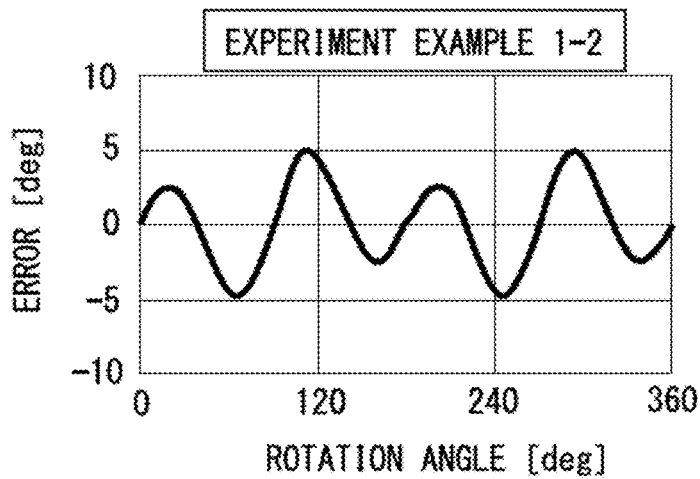
FIG. 7C is a characteristic diagram illustrating an error of the rotation angle to be sensed by each of the magnetic sensing elements in the angle detection system of Experiment Example 1-2.

FIG. 7C illustrates an error of the rotation angle of the magnetic field generation module 2 determined from the curves Δ1 to Δ3 illustrated in FIG. 7B. In this experiment example, a largest value (absolute value) of the error was 4.9°.

Experiment Example 1-3

Figure 8:
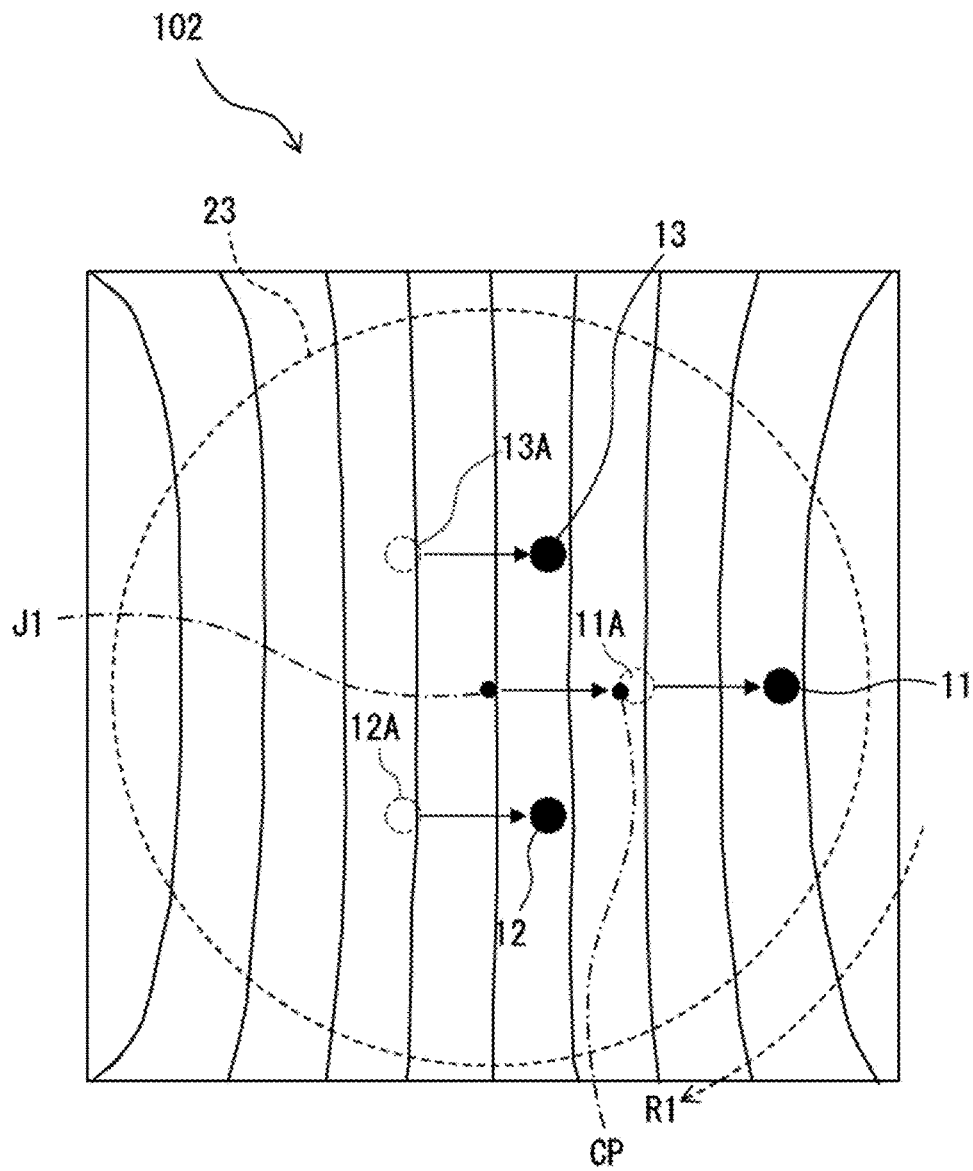
FIG. 8 is a contour diagram schematically illustrating a magnetic flux density distribution in the rotation axis direction in an angle detection system of Experiment Example 1-3.

Next, as Experiment Example 1-3, the angle detection system 102 of the second reference example illustrated in FIG. 25 was subjected to a similar evaluation under similar conditions to those on Experiment Example 1-1 above. FIG. 8 is a contour diagram schematically illustrating a magnetic flux density distribution in the rotation axis direction in the sensing plane of the angle detection system 102 of Experiment Example 1-3. Note that FIG. 8 illustrates a state at a rotation angle of 0°. In Experiment Example 1-3, as illustrated in FIG. 8, the contour lines representing the magnetic flux densities became somewhat curved with increasing distance from the rotation axis J1 with respect to the vertical direction along the opposing surfaces of the two magnets 21 and 22 in the plane of the paper, as compared with Experiment Example 1-1 illustrated in FIG. 4. It is thus seen that the accuracy of angle detection by the magnetic sensing elements 11 to 13 is somewhat lower in Experiment Example 1-3 than in Experiment Example 1-1.

Figure 9A:
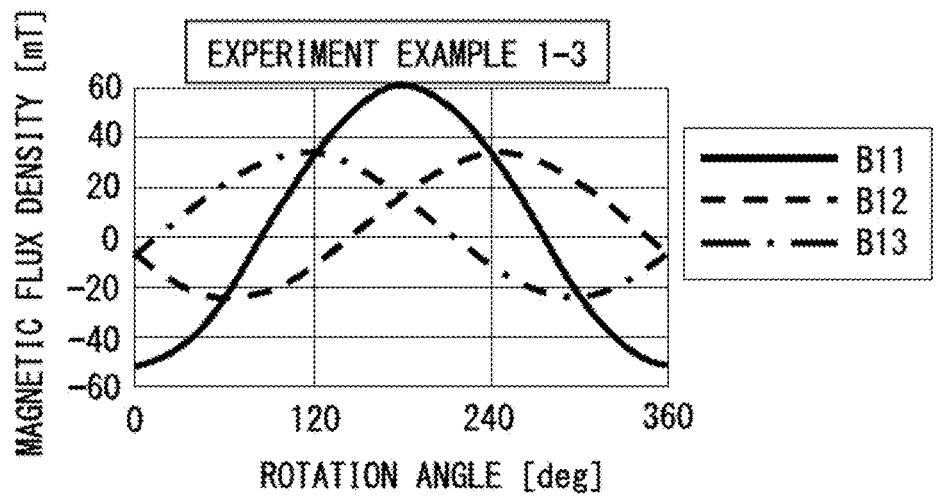
FIG. 9A is a characteristic diagram illustrating a rotation angle dependence of the magnetic flux density of the detection-target magnetic field to be applied to each of the magnetic sensing elements in the angle detection system of Experiment Example 1-3.

FIG. 9A is a characteristic diagram illustrating a relationship between the magnetic flux density [mT] of the detection-target magnetic field to be applied to each of the magnetic sensing elements 11 to 13 and the rotation angle [deg] of the magnetic field generation module 2 in the angle detection system 102 of Experiment Example 1-3.

Figure 9B:
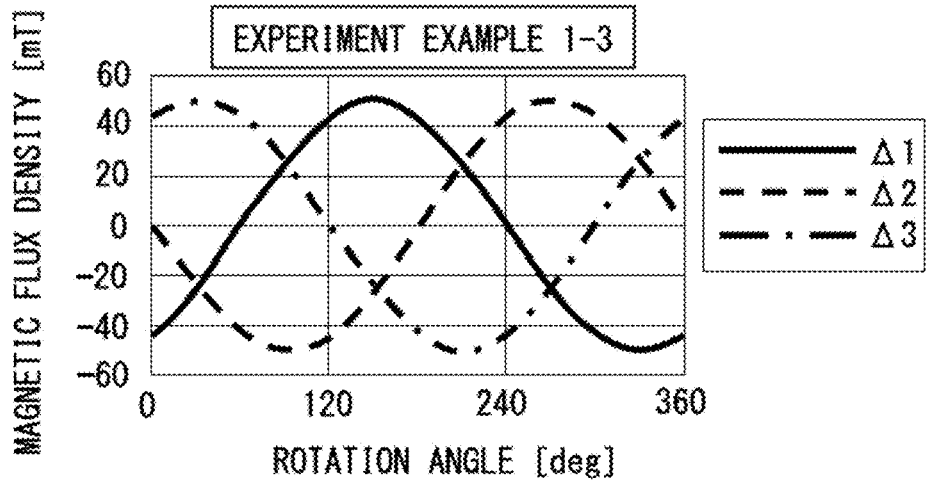
FIG. 9B is a characteristic diagram illustrating differences between the magnetic flux densities of the detection-target magnetic field to be applied to the magnetic sensing elements in the angle detection system of Experiment Example 1-3.

FIG. 9B is a characteristic diagram illustrating how the differences between the curves B11, B12, and B13 illustrated in FIG. 9A changed with the rotation angle [deg] of the magnetic field generation module 2.

Figure 9C:
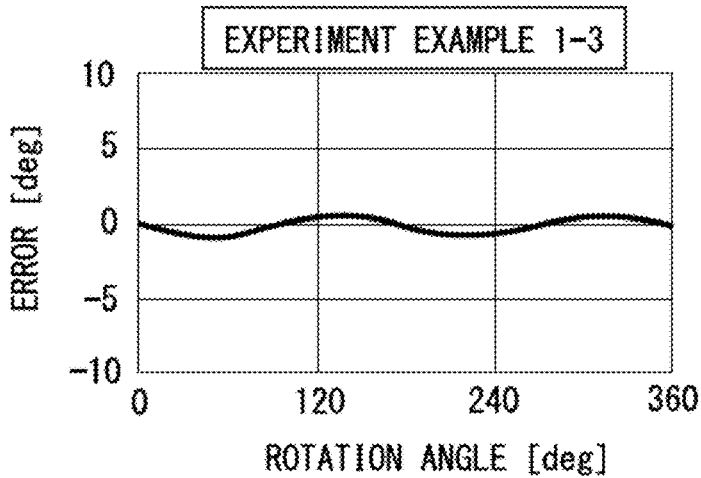
FIG. 9C is a characteristic diagram illustrating an error of the rotation angle to be sensed by each of the magnetic sensing elements in the angle detection system of Experiment Example 1-3.

FIG. 9C illustrates an error of the rotation angle of the magnetic field generation module 2 determined from the curves Δ1 to Δ3 illustrated in FIG. 9B. In this experiment example, a largest value (absolute value) of the error was 0.6°.

Experiment Example 2-1

Figure 10:
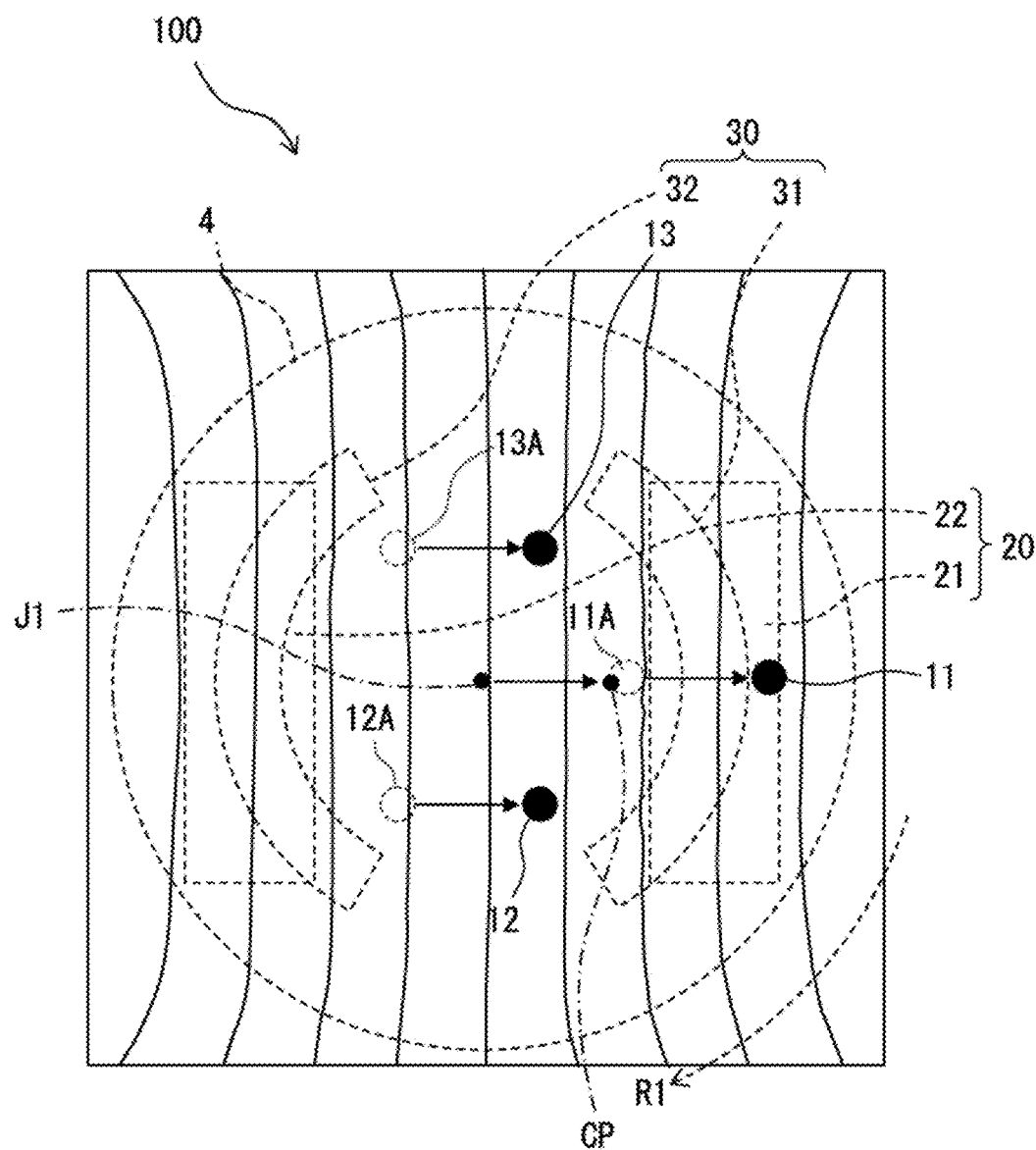
FIG. 10 is a contour diagram schematically illustrating a magnetic flux density distribution in the rotation axis direction in an angle detection system of Experiment Example 2-1.

Next, a simulation was performed on the angle detection system 100 of the above-described example embodiment illustrated in FIG. 1, as Experiment Example 2-1, to determine changes in magnetic flux density to be detected at the sensor unit 1 upon rotation of the magnetic field generation module 2 with a noise magnetic field of an intensity of 5 mT being applied in a direction orthogonal to the rotation axis J1. An evaluation similar to that on Experiment Example 1-1 was performed under conditions similar to those on Experiment Example 1-1 except that the direction of the noise magnetic field was different. FIG. 10 is a contour diagram schematically illustrating a magnetic flux density distribution in the rotation axis direction in the sensing plane of the angle detection system 100 of Experiment Example 2-1. Note that FIG. 10 illustrates a state at a rotation angle of 0°. In Experiment Example 2-1, as illustrated in FIG. 10, the contour lines representing the magnetic flux densities extended vertically along opposing surfaces of the two magnets 21 and 22 in the plane of the paper in at least the region corresponding to the magnetic sensing elements 11 to 13, as in Experiment Example 1-1 illustrated in FIG. 4. This indicates that it is possible to apply a magnetic field having a relatively uniform intensity (magnetic flux density) to the magnetic sensing elements 11 to 13. It is thus seen that this configuration helps to improve the accuracy of angle detection by the magnetic sensing elements 11 to 13.

Figure 11A:
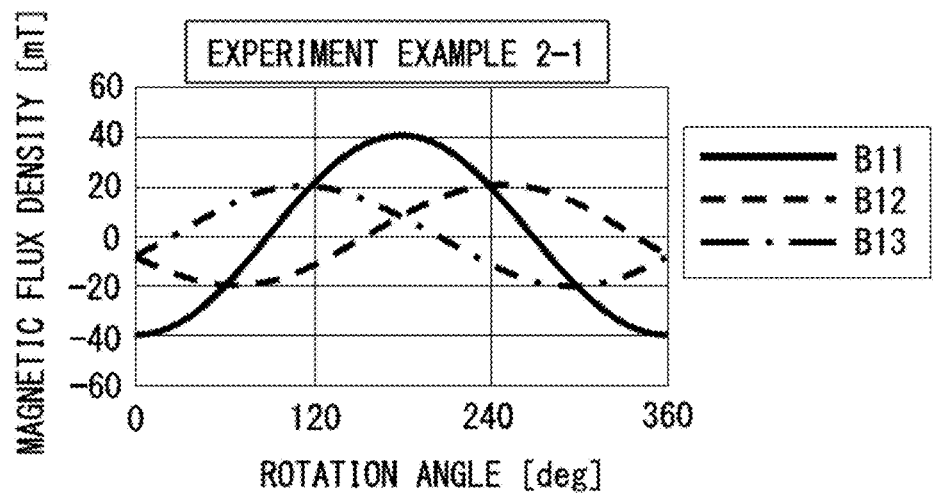
FIG. 11A is a characteristic diagram illustrating a rotation angle dependence of the magnetic flux density of the detection-target magnetic field to be applied to each of the magnetic sensing elements in the angle detection system of Experiment Example 2-1.

FIG. 11A is a characteristic diagram illustrating a relationship between the magnetic flux density [mT] of the detection-target magnetic field to be applied to each of the magnetic sensing elements 11 to 13 and the rotation angle [deg] of the magnetic field generation module 2 in the angle detection system 100 of Experiment Example 2-1.

Figure 11B:
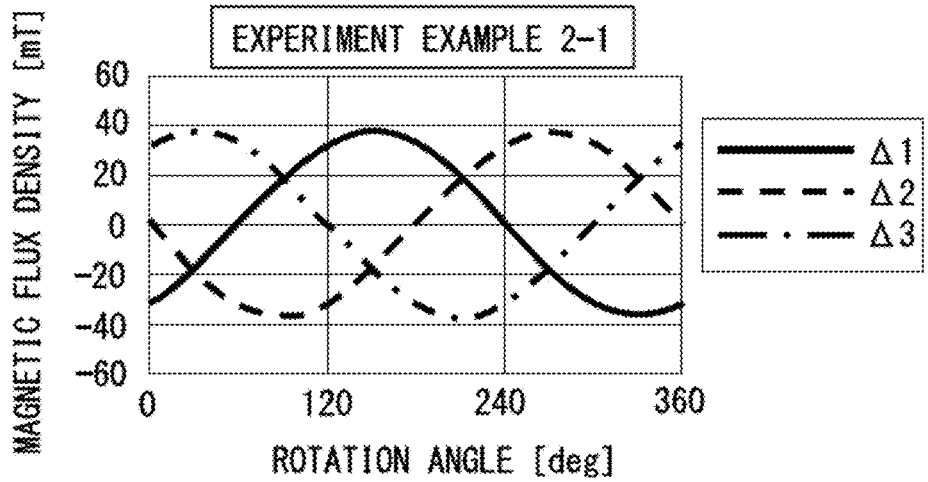
FIG. 11B is a characteristic diagram illustrating differences between the magnetic flux densities of the detection-target magnetic field to be applied to the magnetic sensing elements in the angle detection system of Experiment Example 2-1.

FIG. 11B is a characteristic diagram illustrating how the differences between the curves B11, B12, and B13 illustrated in FIG. 11A changed with the rotation angle [deg] of the magnetic field generation module 2.

Figure 11C:
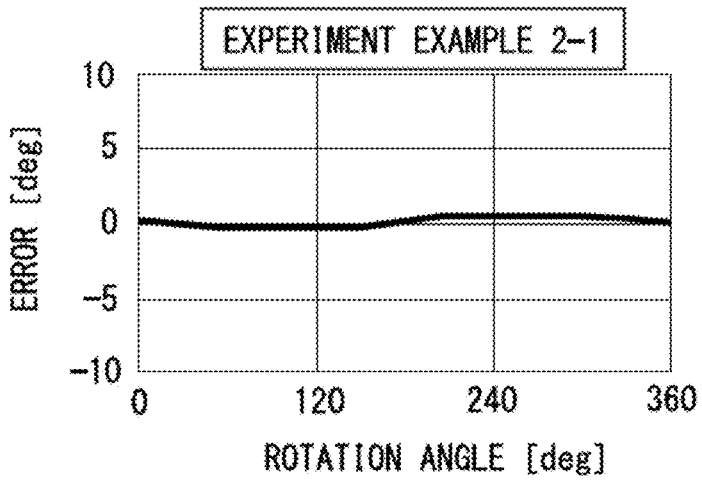
FIG. 11C is a characteristic diagram illustrating an error of the rotation angle to be sensed by each of the magnetic sensing elements in the angle detection system of Experiment Example 2-1.

FIG. 11C illustrates an error of the rotation angle of the magnetic field generation module 2 determined from the curves Δ1 to Δ3 illustrated in FIG. 11B. In this experiment example, a largest value (absolute value) of the error was 0.45°.

Experiment Example 2-2

Figure 12:
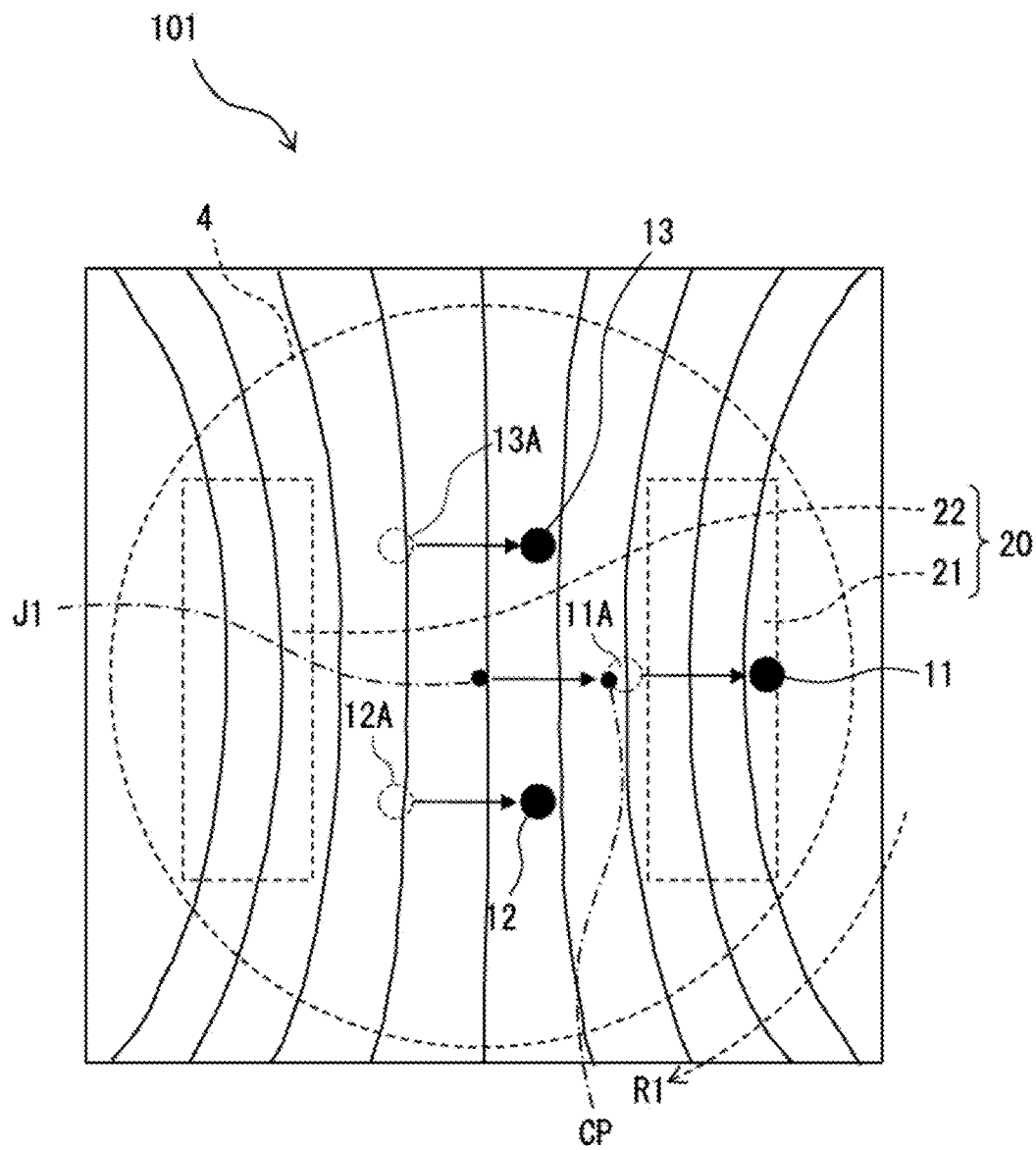
FIG. 12 is a contour diagram schematically illustrating a magnetic flux density distribution in the rotation axis direction in an angle detection system of Experiment Example 2-2.

Next, as Experiment Example 2-2, the angle detection system 101 of the first reference example illustrated in FIG. 24 was subjected to a similar evaluation under similar conditions to those on Experiment Example 2-1 above. FIG. 12 is a contour diagram schematically illustrating a magnetic flux density distribution in the rotation axis direction in the sensing plane of the angle detection system 101 of Experiment Example 2-2. Note that FIG. 12 illustrates a state at a rotation angle of 0°. In Experiment Example 2-2, as illustrated in FIG. 12, the contour lines representing the magnetic flux densities became curved greatly with increasing distance from the rotation axis J1 with respect to the vertical direction along the opposing surfaces of the two magnets 21 and 22 in the plane of the paper, as compared with Experiment Example 2-1 illustrated in FIG. 10. This indicates that the magnetic sensing elements 11 to 13 are to be subjected to a magnetic field that exhibits relatively great unevenness in intensity (magnetic flux density). It is thus seen that this configuration reduces the accuracy of angle detection by the magnetic sensing elements 11 to 13.

Figure 13A:
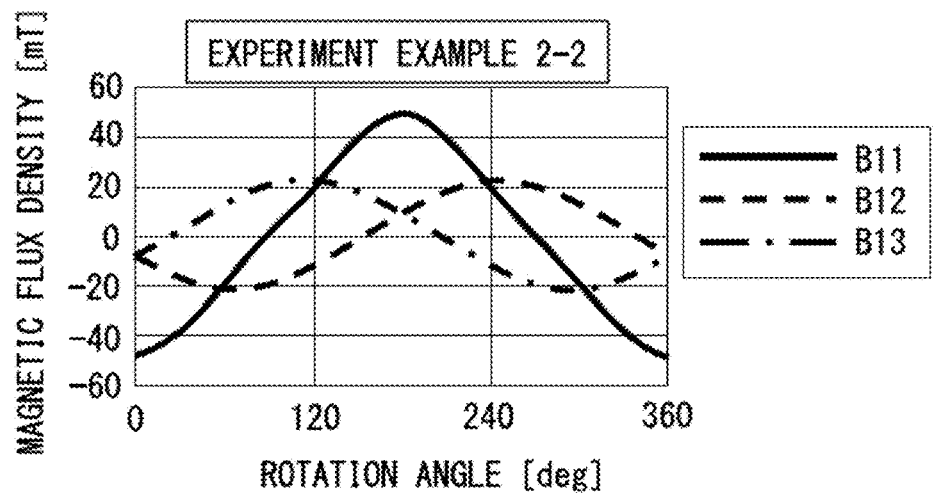
FIG. 13A is a characteristic diagram illustrating a rotation angle dependence of the magnetic flux density of the detection-target magnetic field to be applied to each of the magnetic sensing elements in the angle detection system of Experiment Example 2-2.

FIG. 13A is a characteristic diagram illustrating a relationship between the magnetic flux density [mT] of the detection-target magnetic field to be applied to each of the magnetic sensing elements 11 to 13 and the rotation angle [deg] of the magnetic field generation module 2 in the angle detection system 101 of Experiment Example 2-2.

Figure 13B:
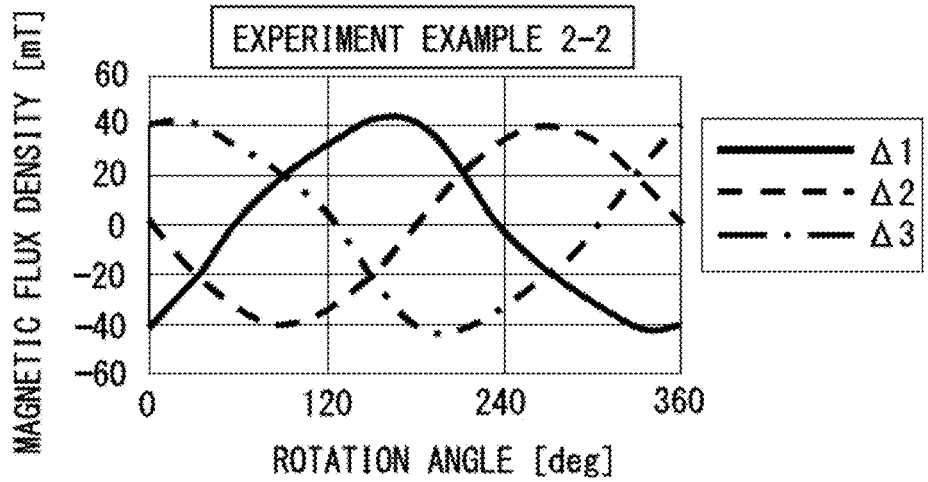
FIG. 13B is a characteristic diagram illustrating differences between the magnetic flux densities of the detection-target magnetic field to be applied to the magnetic sensing elements in the angle detection system of Experiment Example 2-2.

FIG. 13B is a characteristic diagram illustrating how the differences between the curves B11, B12, and B13 illustrated in FIG. 13A changed with the rotation angle [deg] of the magnetic field generation module 2.

Figure 13C:
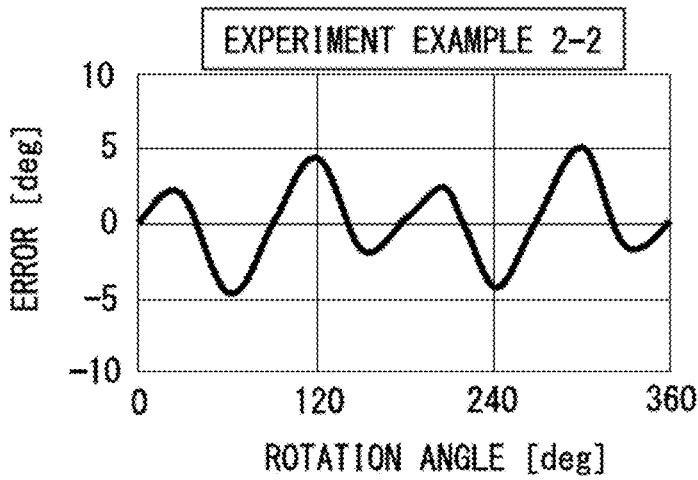
FIG. 13C is a characteristic diagram illustrating an error of the rotation angle to be sensed by each of the magnetic sensing elements in the angle detection system of Experiment Example 2-2.
Figure 14:
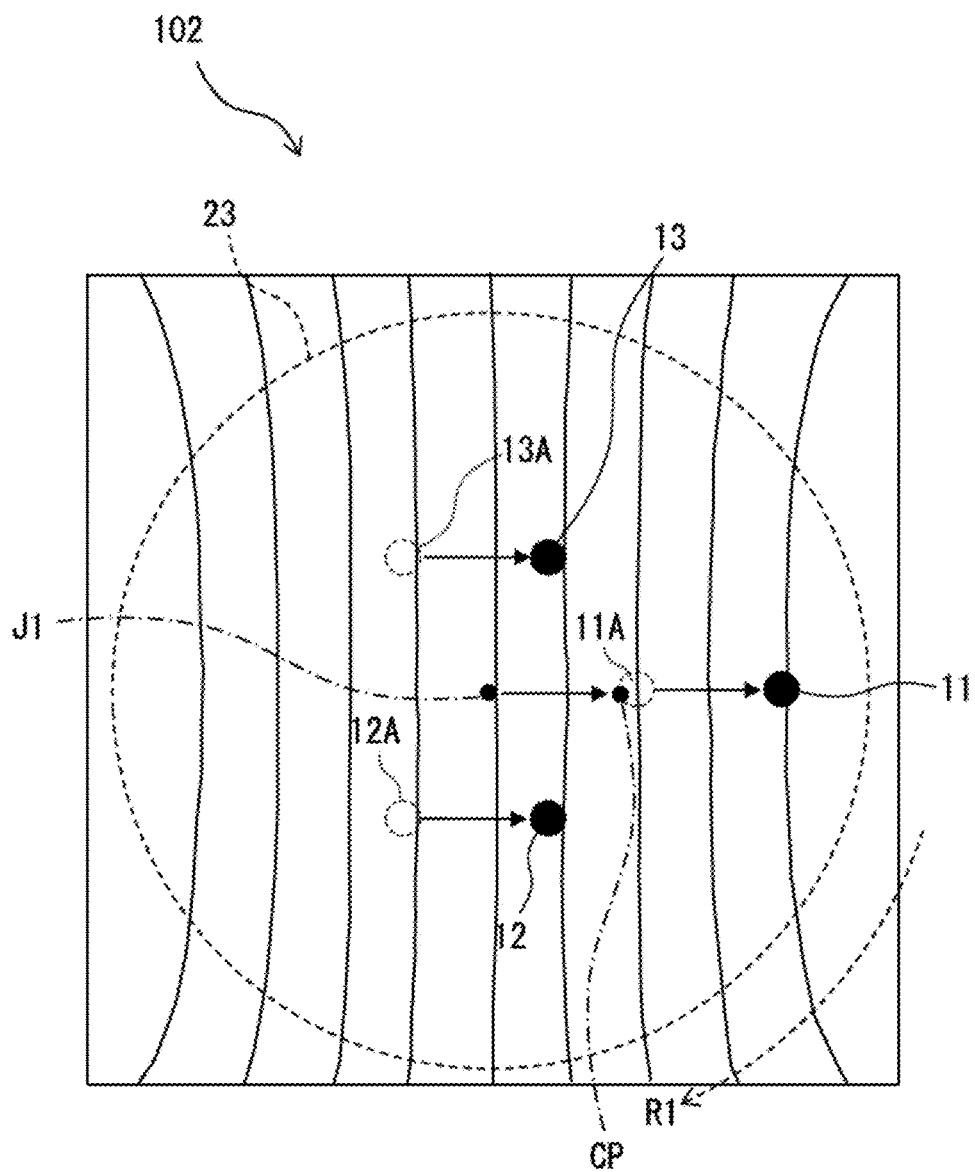
FIG. 14 is a contour diagram schematically illustrating a magnetic flux density distribution in the rotation axis direction in an angle detection system of Experiment Example 2-3.

FIG. 13C illustrates an error of the rotation angle of the magnetic field generation module 2 determined from the curves Δ1 to Δ3 illustrated in FIG. 13B. In this experiment example, a largest value (absolute value) of the error was 5.1°. [Experiment Example 2-3] Next, as Experiment Example 2-3, the angle detection system 102 of the second reference example illustrated in FIG. 25 was subjected to a similar evaluation under similar conditions to those on Experiment Example 2-1 above. FIG. 14 is a contour diagram schematically illustrating a magnetic flux density distribution in the rotation axis direction in the sensing plane of the angle detection system 102 of Experiment Example 2-3. Note that FIG. 14 illustrates a state at a rotation angle of 0°. In Experiment Example 2-3, as illustrated in FIG. 14, the contour lines representing the magnetic flux densities became somewhat curved with increasing distance from the rotation axis J1 with respect to the vertical direction along the opposing surfaces of the two magnets 21 and 22 in the plane of the paper, as compared with Experiment Example 2-1 illustrated in FIG. 10. It is thus seen that the accuracy of angle detection by the magnetic sensing elements 11 to 13 is somewhat lower in Experiment Example 2-3 than in Experiment Example 2-1.

Figure 15A:
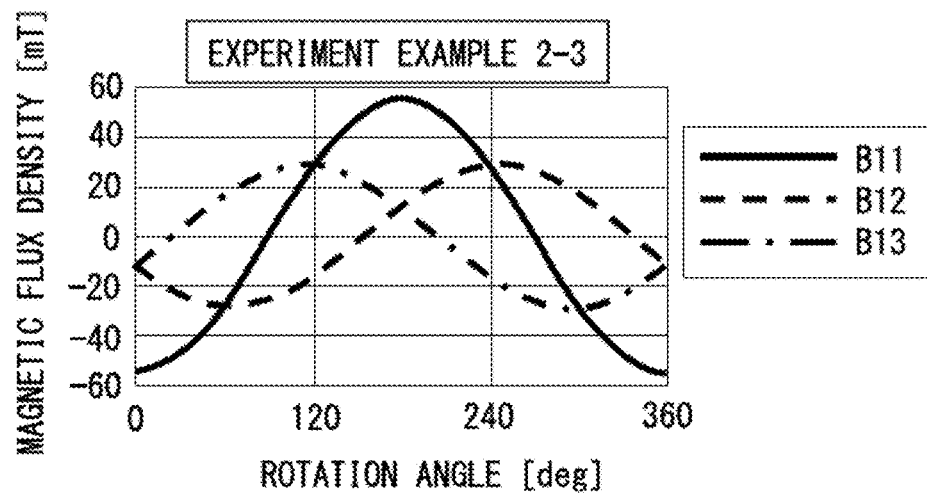
FIG. 15A is a characteristic diagram illustrating a rotation angle dependence of the magnetic flux density of the detection-target magnetic field to be applied to each of the magnetic sensing elements in the angle detection system of Experiment Example 2-3.

FIG. 15A is a characteristic diagram illustrating a relationship between the magnetic flux density [mT] of the detection-target magnetic field to be applied to each of the magnetic sensing elements 11 to 13 and the rotation angle [deg] of the magnetic field generation module 2 in the angle detection system 102 of Experiment Example 2-3.

Figure 15B:
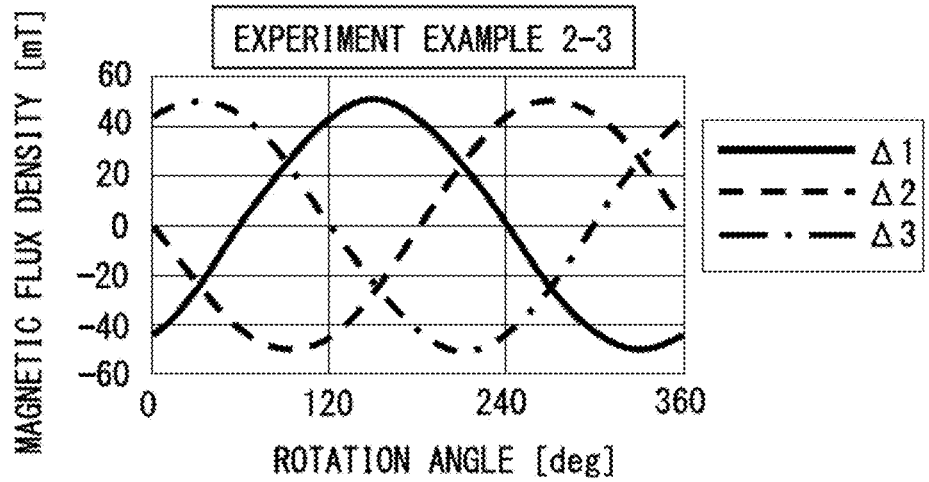
FIG. 15B is a characteristic diagram illustrating differences between the magnetic flux densities of the detection-target magnetic field to be applied to the magnetic sensing elements in the angle detection system of Experiment Example 2-3.

FIG. 15B is a characteristic diagram illustrating how the differences between the curves B11, B12, and B13 illustrated in FIG. 15A changed with the rotation angle [deg] of the magnetic field generation module 2.

Figure 15C:
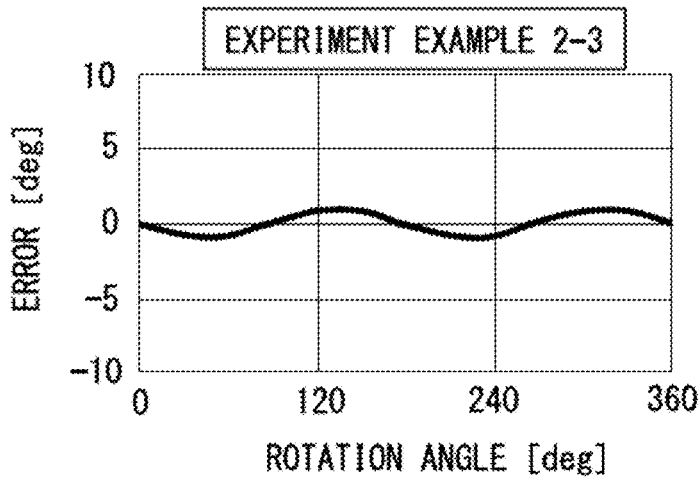
FIG. 15C is a characteristic diagram illustrating an error of the rotation angle to be sensed by each of the magnetic sensing elements in the angle detection system of Experiment Example 2-3.

FIG. 15C illustrates an error of the rotation angle of the magnetic field generation module 2 determined from the curves Δ1 to Δ3 illustrated in FIG. 15B. In this experiment example, a largest value (absolute value) of the error was 0.85°. As described above, it was confirmed that the angle detection system 100 of the present example embodiment is able to achieve reductions in size and weight while ensuring high accuracy of angle detection.

3. MODIFICATION EXAMPLES

First Modification Example

Figure 16:
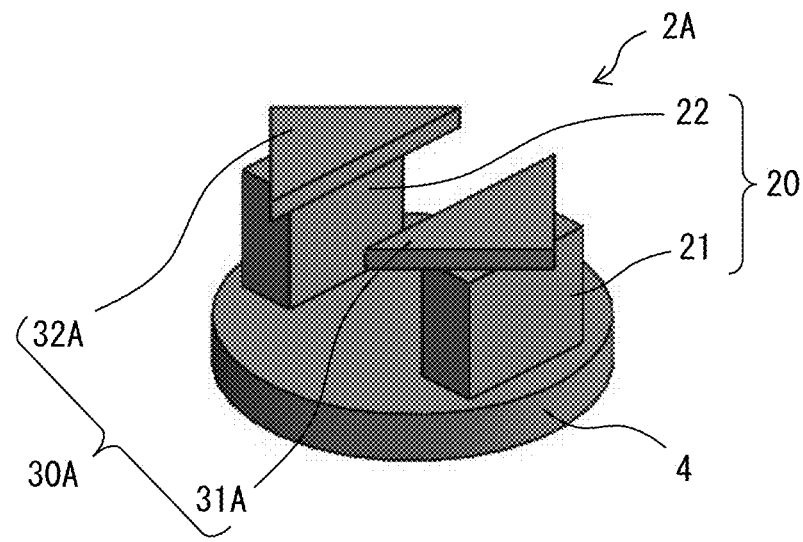
FIG. 16 is a perspective view of an appearance of a magnetic field generation module according to a first modification example.

FIG. 16 is a perspective view of an appearance of a magnetic field generation module 2A according to a first modification example of the example embodiment of the technology. In the magnetic field generation module 2 according to the above-described example embodiment, the yokes 31 and 32 may both be arc-shaped in a plan view. In contrast, the magnetic field generation module 2A according to the first modification example may include yokes 31A and 32A each having a substantially triangular shape in a plan view. In a specific but non-limiting example, the yokes 31A and 32A may be arranged with their opposing end faces being substantially parallel to each other. The first modification example is expected to provide workings and effects similar to those of the example embodiment described above. Furthermore, according to the first modification example, it is easier to fabricate the yokes 31A and 32A than to fabricate the yokes 31 and 32 that are arc-shaped in a plan view. In addition, in attaching the yokes 31A and 32A to the magnets 21 and 22, it is easier to determine the relative positions of the yokes 31A and 32A and to fix them onto the magnets 21 and 22.

Second Modification Example

Figure 17:
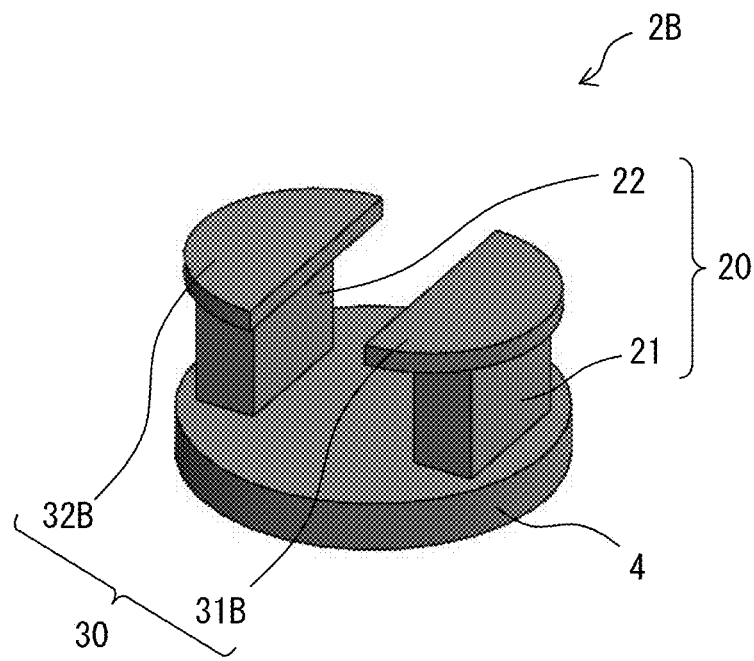
FIG. 17 is a perspective view of an appearance of a magnetic field generation module according to a second modification example.

FIG. 17 is a perspective view of an appearance of a magnetic field generation module 2B according to a second modification example of the example embodiment of the technology. The magnetic field generation module 2B according to the second modification example may include yokes 31B and 32B each having a substantially semicircular shape in a plan view. In a specific but non-limiting example, the yokes 31B and 32B may be arranged with their opposing end faces being substantially parallel to each other. The second modification example is also expected to provide workings and effects similar to those of the example embodiment described above.

Third Modification Example

Figure 18:
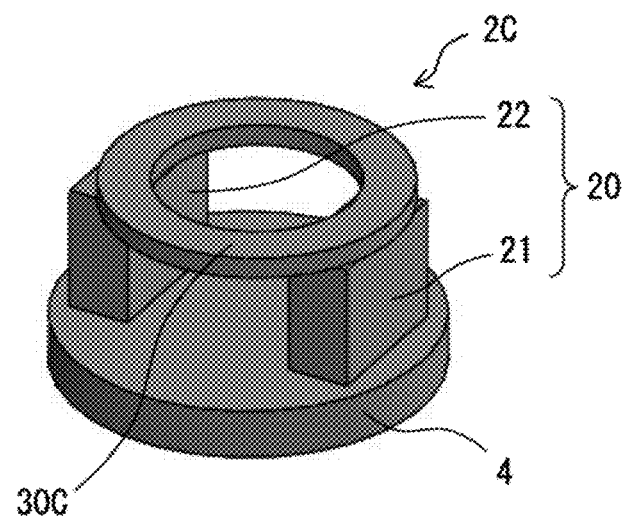
FIG. 18 is a perspective view of an appearance of a magnetic field generation module according to a third modification example.

FIG. 18 is a perspective view of an appearance of a magnetic field generation module 2C according to a third modification example of the example embodiment of the technology. The magnetic field generation module 2C according to the third modification example may include a yoke 30C having a substantially annular shape in a plan view. The yoke 30C may be shared by the magnets 21 and 22, and may be attached to the magnets 21 and 22 directly or indirectly. In other words, the yoke 30C may be in contact with each of the magnets 21 and 22 or may be attached to the magnets 21 and 22 with one or more other members interposed therebetween. The third modification example is also expected to provide workings and effects similar to those of the example embodiment described above. Moreover, according to the third modification example, it is easier to fabricate the yoke 30C than to fabricate the yokes 31 and 32 that are arc-shaped in a plan view. In addition, the third modification example achieves a reduction in the number of components.

Fourth Modification Example

Figure 19:
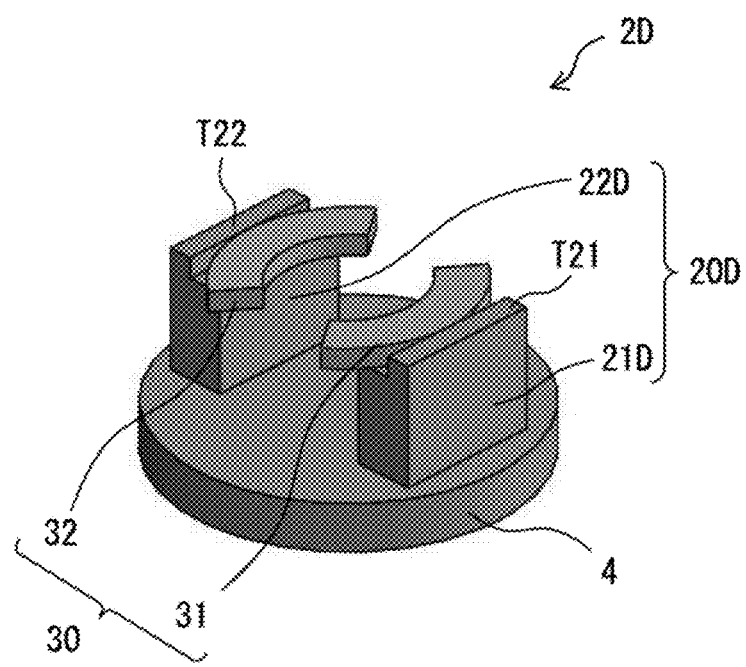
FIG. 19 is a perspective view of an appearance of a magnetic field generation module according to a fourth modification example.

FIG. 19 is a perspective view of an appearance of a magnetic field generation module 2D according to a fourth modification example of the example embodiment of the technology. The magnetic field generation module 2D according to the fourth modification example may have the same configuration as that of the magnetic field generation module 2 according to the above-described example embodiment, except that magnets 21D and 22D are provided in place of the magnets 21 and 22. The magnets 21D and 22D may include stepped parts T21 and T22, respectively, at their top ends. The stepped parts T21 and T22 may be adapted to allow the yokes 31 and 32 to be attached thereon, respectively. Thus, according to the magnetic field generation module 2D of the fourth modification example, the provision of the stepped parts T21 and T22 makes it easy to determine the relative positions of the yokes 31 and 32 with respect to the magnets 21D and 22D and to fix the yokes 31 and 32 onto the magnets 21D and 22D in attaching the yokes 31 and 32 onto the magnets 21D and 22D. Furthermore, it is possible to achieve a reduction in profile. Moreover, the fourth modification example is also expected to provide workings and effects similar to those of the example embodiment described above.

4. APPLICATION EXAMPLES

First Application Example

Figure 20A:
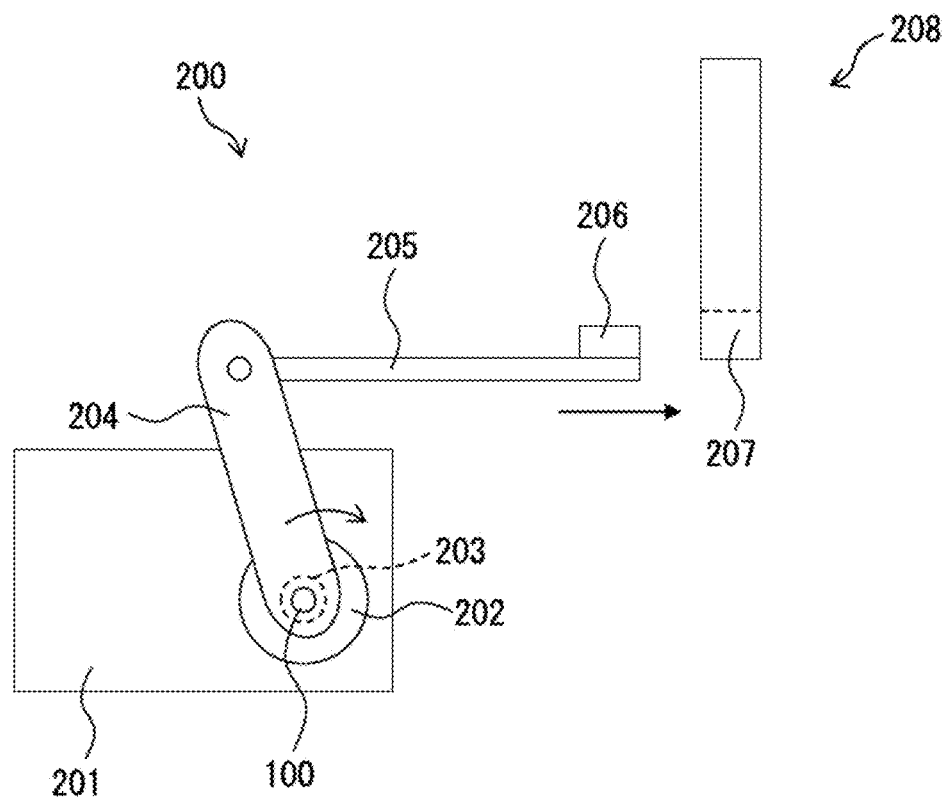
FIG. 20A is a first schematic diagram of a park lock system according to a first application example to which the angle detection apparatus of the example embodiment of the technology is applied.
Figure 20B:
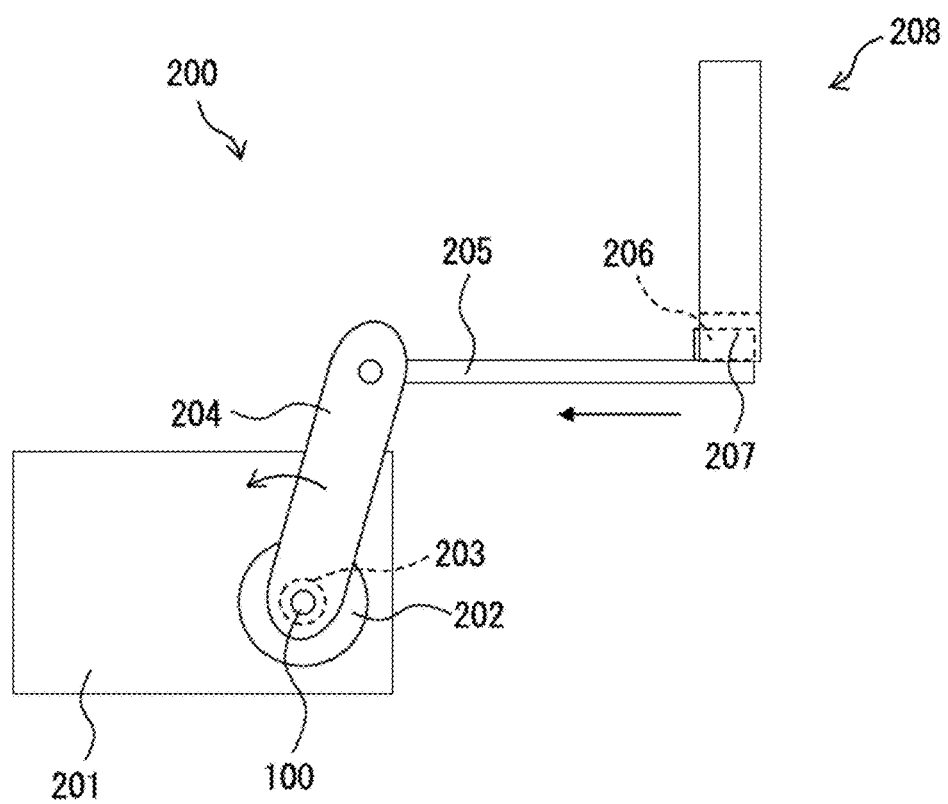
FIG. 20B is a second schematic diagram of the park lock system according to the first application example to which the angle detection apparatus of the example embodiment of the technology is applied.

FIGS. 20A and 20B are schematic diagrams illustrating a park lock system 200 including the angle detection system 100 of the above-described example embodiment. The park lock system 200 is a mechanism that may be installed in, for example, a vehicle such as an automobile and prevent unintentional movement of the vehicle once a shift lever has been shifted to a parking-mode position by a driver when the driver parks the vehicle in a parking lot or the like. FIG. 20A illustrates an unlocked state, and FIG. 20B illustrates a locked state. The park lock system 200 may include a motor 202 provided inside a housing 201, a shaft 203, a lever 204, a rod 205, an engagement part 206, and a parking gear 208 with gear teeth 207. The shaft 203 may extend in a direction perpendicular to the plane of the paper, for example, and may be rotatable by the motor 202. The angle detection system 100 of the above-described example embodiment may be provided at an end of the shaft 203 to detect the rotation angle of the shaft 203. The lever 204 may extend parallel to the plane of the paper and have a proximal end fixed to the shaft 203. The lever 204 may be driven by the motor 202 to pivot along the plane of the paper. A proximal end of the rod 205 may be attached to a distal end of the lever 204. Pivoting of the lever 204 may cause the rod 205 to move in a horizontal direction in the plane of the paper. The engagement part 206 may be provided at a distal end of the rod 205 and configured to be engaged with and disengaged from the gear teeth 207. In the park lock system 200, rotation of the parking gear 208 may be restricted by a shift from the unlocked state illustrated in FIG. 20A to the locked state illustrated in FIG. 20B. In a more specific but non-limiting example, upon rotation of the shaft 203 and the lever 204 in a clockwise direction in the plane of the paper caused by rotation of the motor 202, the rod 205 may slide rightward in the plane of the paper to cause the engagement part 206 to be engaged with the gear teeth 207 to thereby lock the parking gear 208. The restriction of rotation of the parking gear 208 may be released by a shift from the locked state illustrated in FIG. 20B to the unlocked state illustrated in FIG. 20A. In a more specific but non-limiting example, upon rotation of the shaft 203 and the lever 204 in a counterclockwise direction in the plane of the paper caused by rotation of the motor 202, the rod 205 may slide leftward in the plane of the paper to cause the engagement part 206 to be separated from the gear teeth 207 to thereby unlock the parking gear 208. Here, the angle detection system 100 of the above-described example embodiment may detect the rotation angle of the shaft 203 to thereby make it possible to identify whether the parking gear 208 is in the locked state or in the unlocked state with high accuracy.

Second Application Example

Figure 21A:
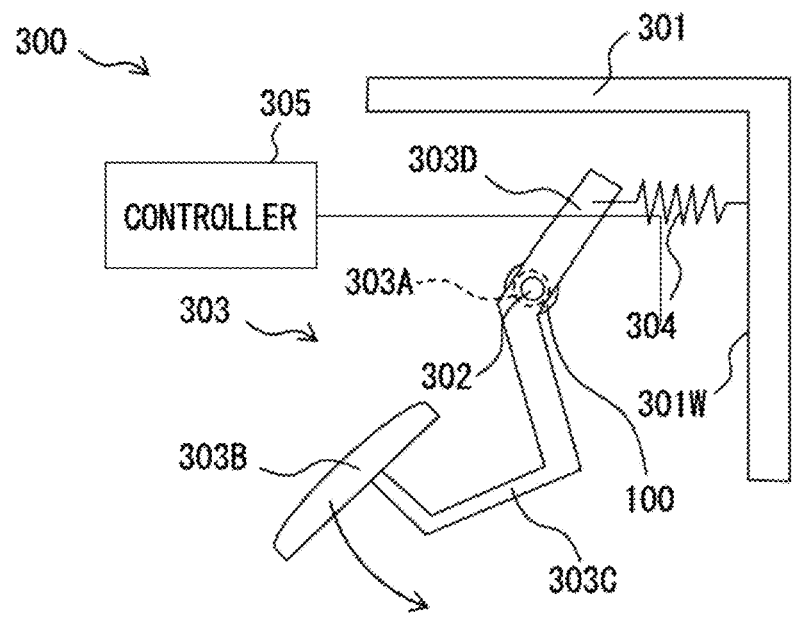
FIG. 21A is a first schematic diagram of a pedal system according to a second application example to which the angle detection apparatus of the example embodiment of the technology is applied.
Figure 21B:
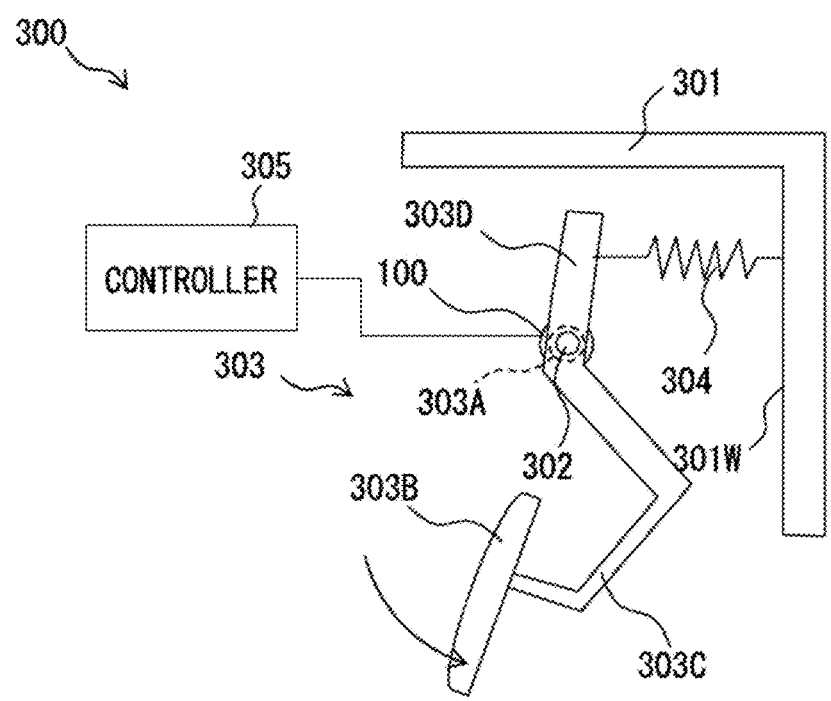
FIG. 21B is a second schematic diagram of the pedal system according to the second application example to which the angle detection apparatus of the example embodiment of the technology is applied.

FIGS. 21A and 21B are schematic diagrams illustrating a pedal system 300 including the angle detection system 100 of the above-described example embodiment. FIG. 21A illustrates an initial state in which a pad 303B (described later) of a pedal 303 is unoperated. FIG. 21B illustrates a depressed state where the pad 303B is operated.

The pedal system 300 may include, for example, a housing 301, a shaft 302 fixed to the housing 301, the pedal 303, and a biasing member 304 such as a tension spring. The pedal 303 may include a bearing 303A inside which the shaft 302 is to be disposed. The bearing 303A allows the pedal 303 to be rotationally movable about the shaft 302.

The pedal 303 may further include, for example, the pad 303B to be operated by a foot of a driver, an arm 303C coupling the pad 303B and the bearing 303A to each other, and a lever 303D provided on a side of the bearing 303A opposite from the arm 303C. The lever 303D may be coupled to the biasing member 304 and configured to be biased by the biasing member 304 toward a wall 301W of the housing 301.

The angle detection system 100 may be provided near the bearing 303A and configured to accurately detect the rotation angle of the arm 303C rotatable about the shaft 302, and to transmit a voltage signal (a proportional signal) corresponding to the rotation angle to a controller 305. The controller 305 may analyze the voltage signal and control opening and closing operations of a throttle valve to achieve a throttle valve position corresponding to the voltage signal.

In the pedal system 300, when the pad 303B in the initial state illustrated in FIG. 21A is depressed by the driver, the pedal 303 rotates counterclockwise about the shaft 302 in the plane of the paper to shift to a depressed state illustrated in FIG. 21B. At this time, the degree of opening of the throttle valve increases. In contrast, when the driver decreases the amount of depressing of the pad 303B or stops depressing the pad 303B, the depressed state illustrated in FIG. 21B shifts to the initial state illustrated in FIG. 21A. At this time, the degree of opening of the throttle valve decreases.

As described above, in the pedal system 300, the angle detection system 100 of the above-described example embodiment is able to detect the rotation angle of the arm 303C accurately. This makes it possible to adjust the throttle valve position with high accuracy.

5. OTHER MODIFICATION EXAMPLES

The technology has been described above with reference to the example embodiment and some modification examples. However, the technology is not limited thereto, and may be modified in a variety of ways. For example, the foregoing example embodiment, etc. have been described with reference to an example case where a vertical Hall element is used as the magnetic sensing element. However, in embodiments of the technology, the magnetic sensing element may be any element having a function of sensing a magnetic field. The term "magnetic sensing element" may encompass also magnetoresistive effect (MR) elements including, without limitation, an anisotropic magnetoresistive effect (AMR) element, a spin-valve giant magnetoresistive effect (GMR) element, and a tunneling magnetoresistive (TMR) element. In a case of using an MR element such as the GMR element or the TMR element, the MR element may sense changes in direction and/or intensity of a magnetic field in a plane orthogonal to the rotation axis J1. Because the technology makes it possible to reduce unevenness of a magnetic field intensity distribution (a magnetic flux density distribution) not only in the rotation axis direction but also in a plane orthogonal to the rotation axis, a magnetic sensing element that senses changes in direction and/or intensity of a magnetic field in a plane orthogonal to the rotation axis J1, such as the MR element, is considered to be applicable. The dimensions of components and the layouts of the components are merely illustrative, and are not limited thereto.

Although the foregoing example embodiment, etc. have been described with reference to an example case where the sensor unit 1 of the angle detection apparatus 10 includes the three magnetic sensing elements 11 to 13, embodiments of the technology are not limited thereto. In some embodiments of the technology, the angle detection apparatus may include, for example, only a single magnetic sensing element, two magnetic sensing elements, or four or more magnetic sensing elements.

Further, although the foregoing example embodiment, etc. have been described with reference to an example case where the magnetic field generation unit 20 of the angle detection apparatus 10 includes the two magnets as magnetic field generators, embodiments of the technology are not limited thereto. In some embodiments of the technology, the angle detection apparatus may include, for example, only a single magnetic field generator, or three or more magnetic field generators.

Figure 22:
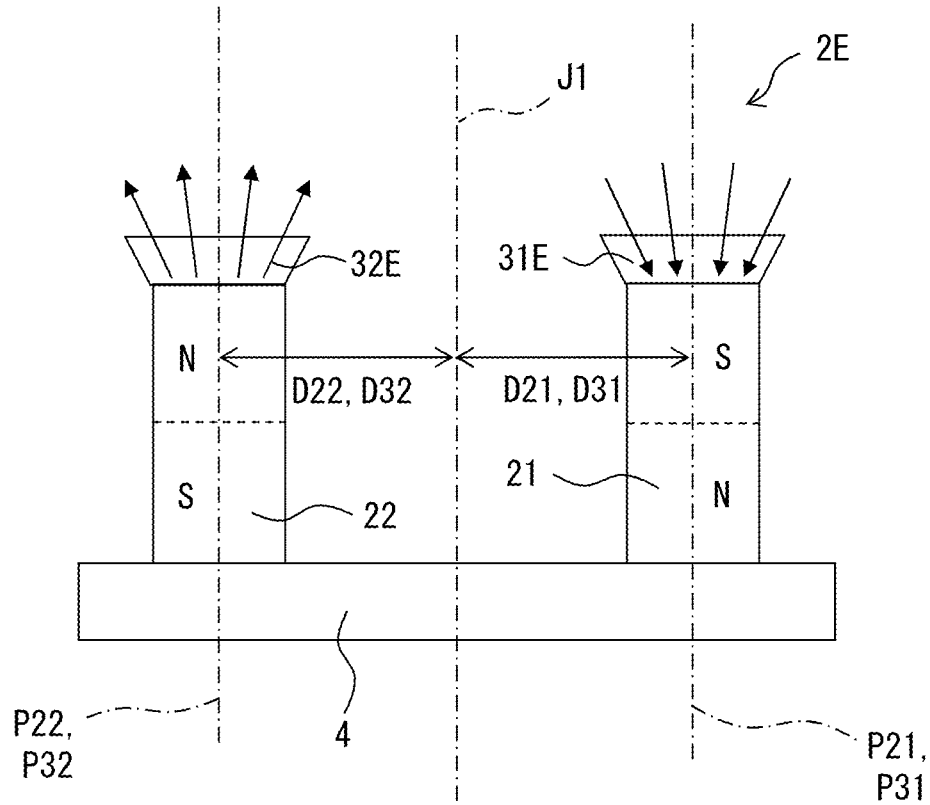
FIG. 22 is a front view of an appearance of a magnetic field generation module according to a fifth modification example.
Figure 23:
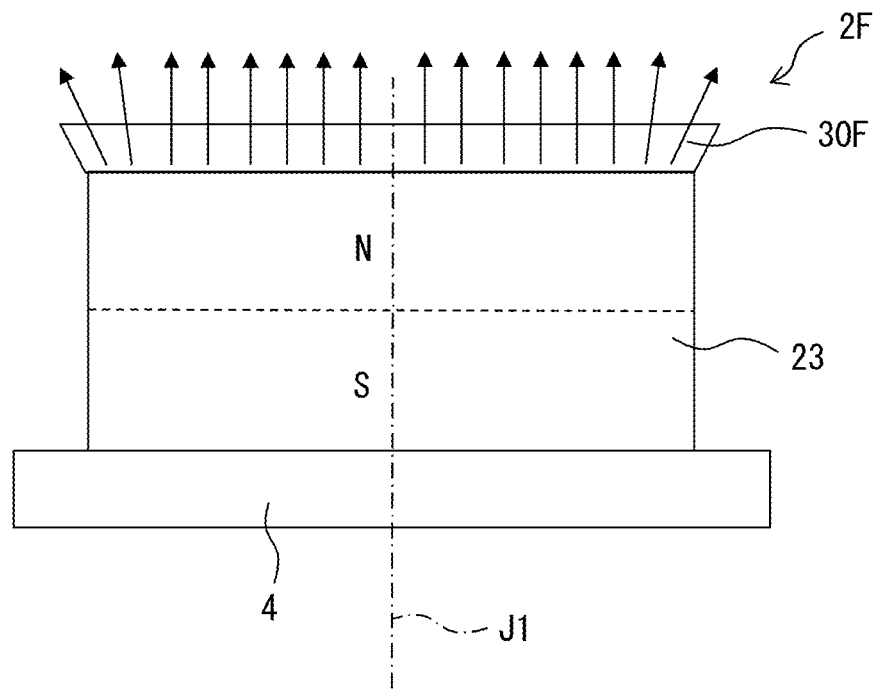
FIG. 23 is a front view of an appearance of a magnetic field generation module according to a sixth modification example.

Furthermore, in some embodiments of the technology, the angle detection apparatus may include a magnetic field generation module 2E of a fifth modification example including yokes 31E and 32E as illustrated in FIG. 22, for example. A cross section of each of the yokes 31E and 32E along the rotation axis J1 may include an inverted trapezoidal shape having a width that increases with increasing distance from a corresponding one of the magnets 21 and 22. In such a case, magnetic fluxes from the magnets 21 and 22 are widened by the yokes 31E and 32E to spread over a wider range. This similarly applies to a case where the single magnet 23 of a cylindrical shape is provided as in a magnetic field generation module 2F of a sixth modification example illustrated in FIG. 23. The magnetic field generation module 2F may include a yoke 30F shaped to include an inverted trapezoidal shape having a width that increases with increasing distance from the magnet 23.

The technology encompasses any possible combination of some or all of the various embodiments and the modifications described herein and incorporated herein.

It is possible to achieve at least the following configurations from the foregoing embodiments and modification examples of the technology.

(1)
An angle detection apparatus including:
a magnetic sensing element;
a magnetic field generator that is rotatable around a rotation axis with respect to the magnetic sensing element and generates a magnetic field; and
a yoke that is disposed in a magnetic-field influence region and rotatable together with the magnetic field generator, the magnetic-field influence region being a region that lies between the magnetic field generator and the magnetic sensing element in a rotation axis direction along the rotation axis, and that is to be influenced by the magnetic field.

(2)
The angle detection apparatus according to (1), in which the yoke is positioned to overlap the magnetic field generator in the rotation axis direction.

(3)
The angle detection apparatus according to (1) or (2), in which the yoke is in contact with the magnetic field generator.

(4)
The angle detection apparatus according to any one of (1) to (3), in which a height dimension of the magnetic field generator in the rotation axis direction is greater than a height dimension of the yoke in the rotation axis direction.

(5)
The angle detection apparatus according to any one of (1) to (4), in which the magnetic field generator is magnetized in the rotation axis direction.

(6)
The angle detection apparatus according to any one of (1) to (5), in which the magnetic field generator has a substantially cube shape or a substantially cuboid shape.

(7)
The angle detection apparatus according to any one of (1) to (6), in which the magnetic field generator includes a plurality of the magnetic field generators, the magnetic field generators being spaced apart from each other around the rotation axis.

(8)

The angle detection apparatus according to (7), in which the magnetic field generators are substantially identical in material, shape, and size.

(9)

The angle detection apparatus according to (7) or (8), in which the magnetic field generators are at substantially equal distances from the rotation axis.

(10)

The angle detection apparatus according to any one of (7) to (9), in which the magnetic field generators include a first magnetic field generator and a second magnetic field generator that are opposed to each other with the rotation axis interposed therebetween.

(11)

The angle detection apparatus according to any one of (1) to (10), in which a cross section of the yoke along the rotation axis includes an inverted trapezoidal shape having a width that increases with increasing distance from the magnetic field generator.

(12)

The angle detection apparatus according to any one of (1) to (11), in which, in a plane orthogonal to the rotation axis, the yoke is curved in an arc shape along a direction of rotation around the rotation axis.

(13)

The angle detection apparatus according to any one of (1) to (12), in which the yoke includes a plurality of the yokes, the yokes being spaced apart from each other around the rotation axis.

(14)

The angle detection apparatus according to (13), in which the yokes are substantially identical in material, shape, and size.

(15)

The angle detection apparatus according to (13) or (14), in which the yokes are at substantially equal distances from the rotation axis.

(16)

The angle detection apparatus according to any one of (13) to (15), in which the yokes include a first yoke and a second yoke that are opposed to each other with the rotation axis interposed therebetween.

(17)

The angle detection apparatus according to any one of (1) to (16), in which the magnetic sensing element has a sensitive axis along the rotation axis direction.

(18)

The angle detection apparatus according to any one of (1) to (17), in which the magnetic sensing element includes a plurality of the magnetic sensing elements.

(19)

The angle detection apparatus according to (18), in which the magnetic sensing elements are provided at positions different from each other in a plane orthogonal to the rotation axis direction.

(20)

An angle detection system including:
 the angle detection apparatus according to any one of (1) to (19); and
 a support supporting the magnetic field generator, in which
 the support includes an attachment hole, and
 the yoke is provided on the magnetic field generator or on the support.

(21)

A park lock system including the angle detection system according to claim 20.

(22)

A pedal system including the angle detection system according to claim 20.

(23)

A magnetic field generation module including:
 a magnetic field generator that is rotatable around a rotation axis; and
 a yoke that is disposed in a region different from a region where the magnetic field generator is disposed in a rotation axis direction along the rotation axis, and rotatable together with the magnetic field generator.

(24)

The magnetic field generation module according to (23), in which the magnetic field generator has a first height dimension in the rotation axis direction, and the yoke has a second height dimension in the rotation axis direction, the first height dimension being greater than the second height dimension.

The angle detection apparatus, the angle detection system, the park lock system, the pedal system, and the magnetic field generation module according to at least one embodiment of the technology achieve high accuracy of angle detection.

Although the technology has been described hereinabove in terms of the example embodiment and modification examples, it is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. An angle detection apparatus comprising:
 a magnetic sensing element;
 a first magnetic field generator and a second magnetic field generator being opposed to each other with a rotation axis interposed therebetween and rotatable around the rotation axis with respect to the magnetic sensing element, and generating a magnetic field; and
 a first yoke and a second yoke opposed to each other with the rotation axis interposed therebetween and disposed in a magnetic-field influence region,
 wherein
 each of the first magnetic field generator and the second magnetic field generator is magnetized in the rotation axis direction, the first yoke is disposed in between the first magnetic field generator and the magnetic sensing element in the rotation axis direction along the rotation axis, the second yoke is disposed in between the second magnetic field generator and the magnetic sensing element in the rotation axis direction, the first magnetic field generator, the second magnetic field generator, the first yoke, and the second yoke are rotatable together around the rotation axis, the first yoke overlaps at least a portion of the first magnetic field generator in the rotation axis direction, without overlapping with both of the first magnetic field generator and the second magnetic field generator as viewed from a direction orthogonal to the rotation axis direction, the second yoke overlaps at least a portion of the second magnetic field generator in the rotation axis direction, without overlapping with both of the first magnetic field generator and the second magnetic field generator as viewed from the direction orthogonal to the rotation axis direction, a distance between the first yoke and the magnetic sensing element in the rotation axis direction is shorter than a distance between the first magnetic field generator and the magnetic sensing element in the rotation axis direction, and a distance between the second yoke and the magnetic sensing element in the rotation axis direction is shorter than a distance between the second magnetic field generator and the magnetic sensing element in the rotation axis direction.

2. The angle detection apparatus according to claim 1, wherein the first yoke is in contact with the first magnetic field generator.

3. The angle detection apparatus according to claim 1, wherein a height dimension of the first magnetic field generator in the rotation axis direction is greater than a height dimension of the first yoke in the rotation axis direction.

4. The angle detection apparatus according to claim 1, wherein the first magnetic field generator has a cube shape or a cuboid shape.

5. The angle detection apparatus according to claim 1, wherein the first and second magnetic field generators are identical in material, shape, and size.

6. The angle detection apparatus according to claim 1, wherein the first and second magnetic field generators are at equal distances from the rotation axis.

7. The angle detection apparatus according to claim 1, wherein a cross section of the first yoke along the rotation axis includes an inverted trapezoidal shape having a width that increases with increasing distance from the first magnetic field generator.

8. The angle detection apparatus according to claim 1, wherein, in a plane orthogonal to the rotation axis, the first yoke is curved in an arc shape along a direction of rotation around the rotation axis.

9. The angle detection apparatus according to claim 1, wherein the first and second yokes are identical in material, shape, and size.

10. The angle detection apparatus according to claim 1, wherein the first and second yokes are at equal distances from the rotation axis.

11. The angle detection apparatus according to claim 1, wherein the magnetic sensing element has a sensitive axis along the rotation axis direction.

12. The angle detection apparatus according to claim 1, wherein the magnetic sensing element is one of a plurality of magnetic sensing elements.

13. The angle detection apparatus according to claim 12, wherein the magnetic sensing elements are provided at positions different from each other in a plane orthogonal to the rotation axis direction.

14. An angle detection system including:
the angle detection apparatus according to claim 1; and
a support supporting the first and second magnetic field generators, wherein
the support includes an attachment hole, and
the first yoke is provided on the first magnetic field generator or on the support, and the second yoke is provided on the second magnetic field generator or on the support.

15. A park lock system including the angle detection system according to claim 14.

16. A pedal system including the angle detection system according to claim 14.

17. The angle detection apparatus according to claim 1, wherein the first yoke and the second yoke are made from a soft magnetic material.

18. The angle detection apparatus according to claim 1, wherein the first yoke and the second yoke are only located on one side of the first magnetic field generator and the second magnetic field generator, respectively.

* * * * *